US010502505B2

(12) United States Patent
Yang et al.

(10) Patent No.: US 10,502,505 B2
(45) Date of Patent: Dec. 10, 2019

(54) RADIATIVE COOLING STRUCTURES AND SYSTEMS

(71) Applicants: THE REGENTS OF THE UNIVERSITY OF COLORADO, A BODY CORPORATE, Boulder, CO (US); UNIVERSITY OF WYOMING, Laramie, WY (US)

(72) Inventors: Ronggui Yang, Boulder, CO (US); Xiaobo Yin, Boulder, CO (US); Gang Tan, Fort Collins, CO (US); Dongliang Zhao, Boulder, CO (US); Yaoguang Ma, Boulder, CO (US); Yao Zhai, Boulder, CO (US)

(73) Assignees: The Regents of the Univeristy of Colorado, a Body Corporate, Denver, CO (US); University of Wyoming, Laramie, WY (US)

( * ) Notice: Subject to any disclaimer, the term of this patent is extended or adjusted under 35 U.S.C. 154(b) by 0 days.

(21) Appl. No.: 15/056,680

(22) Filed: Feb. 29, 2016

(65) Prior Publication Data

US 2017/0248381 A1 Aug. 31, 2017

(51) Int. Cl.
*F28F 13/18* (2006.01)
*F28F 21/06* (2006.01)
(Continued)

(52) U.S. Cl.
CPC .............. *F28F 13/18* (2013.01); *B23P 15/26* (2013.01); *F28F 21/02* (2013.01); *F28F 21/067* (2013.01);
(Continued)

(58) Field of Classification Search
CPC .. F28F 13/18; F28F 21/02; F28F 21/06; F28F 21/067; F28F 21/08; F28F 21/089;
(Continued)

(56) References Cited

U.S. PATENT DOCUMENTS

| 2,289,809 A | 7/1942 | Sherwood |
| 3,043,112 A | 7/1962 | Head |

(Continued)

FOREIGN PATENT DOCUMENTS

| CN | 101092533 A | 12/2007 |
| CN | 103287014 A | 9/2013 |

(Continued)

OTHER PUBLICATIONS

EPO Machine translation of CN101092533A published Dec. 2007. (Year: 2007).*

(Continued)

*Primary Examiner* — Monique R Jackson
(74) *Attorney, Agent, or Firm* — Leydig, Voit & Mayer, Ltd.

(57) ABSTRACT

Polymer-based selective radiative cooling structures are provided which include a selectively emissive layer of a polymer or a polymer matrix composite material. Exemplary selective radiative cooling structures are in the form of a sheet, film or coating. Also provided are methods for removing heat from a body by selective thermal radiation using polymer-based selective radiative cooling structures.

20 Claims, 24 Drawing Sheets

(51) Int. Cl.
  *F28F 21/08* (2006.01)
  *F28F 21/02* (2006.01)
  *B23P 15/26* (2006.01)
  B32B 27/32 (2006.01)
  B32B 27/36 (2006.01)

(52) U.S. Cl.
  CPC .......... *F28F 21/089* (2013.01); *B32B 27/32* (2013.01); *B32B 27/36* (2013.01); *B32B 2255/10* (2013.01); *B32B 2255/205* (2013.01); *B32B 2264/102* (2013.01); *B32B 2307/416* (2013.01)

(58) Field of Classification Search
  CPC .......... C08L 27/14; C08L 23/20; C08K 3/36; C08K 2003/265; C08K 2003/2241; C08K 2003/2296; C08K 2003/2227; C08K 3/40; C09D 123/20
  See application file for complete search history.

(56) References Cited

U.S. PATENT DOCUMENTS

| | | | |
|---|---|---|---|
| 3,310,102 A | 3/1967 | Trombe | |
| 3,655,426 A * | 4/1972 | Fuchs | B05D 7/14 427/388.3 |
| 3,671,286 A | 7/1972 | Fischell | |
| 4,249,386 A | 2/1981 | Smith et al. | |
| 4,586,350 A | 5/1986 | Berdahl | |
| 5,405,680 A | 4/1995 | Chang et al. | |
| 7,503,971 B2 | 3/2009 | Wojtysiak et al. | |
| 8,911,836 B2 * | 12/2014 | Ladd | C09D 5/004 427/160 |
| 2004/0185276 A1* | 9/2004 | Hara | B32B 15/08 428/458 |
| 2008/0318031 A1 | 12/2008 | Smith | |
| 2010/0155043 A1* | 6/2010 | Smith | C09K 5/14 165/185 |
| 2013/0072617 A1 | 3/2013 | Agari et al. | |
| 2014/0131023 A1 | 5/2014 | Raman et al. | |
| 2014/0271754 A1* | 9/2014 | Blaney | A61K 9/70 424/402 |
| 2015/0131023 A1 | 5/2015 | Kim et al. | |
| 2015/0131146 A1 | 5/2015 | Fan et al. | |
| 2015/0224742 A1 | 8/2015 | Inoue et al. | |
| 2015/0338175 A1 | 11/2015 | Raman et al. | |
| 2016/0122479 A1* | 5/2016 | Kozyuk | B29B 7/005 252/514 |
| 2016/0326351 A1 | 11/2016 | Yalcin et al. | |
| 2016/0356561 A1† | 12/2016 | Heltzel | |
| 2018/0180331 A1 | 6/2018 | Yu et al. | |

FOREIGN PATENT DOCUMENTS

| | | | | |
|---|---|---|---|---|
| DE | 19849330 A1 * | 4/2000 | ............ | C03C 17/34 |
| FR | 2917417 A1 * | 12/2008 | ............ | C09D 5/004 |
| JP | S6086173 A | 5/1985 | | |
| JP | 2010000460 A * | 1/2010 | | |
| JP | 2015193848 A | 11/2015 | | |
| WO | WO2008154692 | 12/2008 | | |
| WO | WO 2009/112495 A1 | 9/2009 | | |
| WO | WO 2015/073714 A1 | 5/2015 | | |
| WO | WO-2015103096 A1 * | 7/2015 | ............... | C08K 7/28 |
| WO | WO 2016205717 A1 * | 12/2016 | ............. | F24J 2/0488 |

OTHER PUBLICATIONS

EPO Machine translation of DE19849330A1 published Apr. 2000. (Year: 2000).*
AkzoNobel, Product Specification for Expancel Microspheres, May 2017. (Year: 2017).*
EPO Machine translation of FR2917417A1 published Dec. 2008. (Year: 2008).*
Brady, Principles and formulations for organic coatings with tailored infrared properties, 1992, Progress in Organic Coatings, vol. 20, pp. 1-25. (Year: 1992).*
Machine translation of JP2010-000460A, published Jan. 2010. (Year: 2010).*
Tesh, New metamaterial enhances natural cooling without power input, 2017, Physics World, (Year: 2017).*
Corbitt, Implementation of optical dielectric metamaterials: A review, 2015, Journal of Quantitative Spectroscopy & Radiative Transfer 158, pp. 3-16. (Year: 2015).*
Hossain, Radiative Cooling: Principles, Progress, and Potentials, 2016, Advanced Science, vol. 3, 1500360. (Year: 2016).*
Wogan, Film printed by the metre can cool homes without any power, 2017, Chemistry World, Science/AAAS. (Year: 2017).*
Gentle et al. "A Subambient Open Roof Surface under the Mid-Summer Sun," Advanced Science 2015, 2, 4 pp.
Nilsson et al. "A solar reflecting material for radiative cooling applications: ZnS pigmented polyethylene," Proceedings of SPIE—The International Society for Optical Engineering, Nov. 1992, 14 pp.
TPX Brochure, Mitsui Chemical, Inc, Sep. 2011, 6 pp.
Rephaeli et al. (Mar. 5, 2013) "Ultrabroadband photonic structures to achieve high-performance daytime radiative cooling," Nano letters. 13(4):1457-1461.
International Search Report with Written Opinion corresponding to International Patent Application No. PCT/US2017/019727, dated Jun. 27, 2017.
Raman, A. et al. (2014) "Passive radiative cooling below ambient air temperature under direct sunlight," Nature 515:540 (11 pages).
Yang R. et al. (Feb. 2016) Radiative Cooled-Cold Storage Modules and System (RadiCold), Poster Presentation at the 2016 ARPA-E Energy Innovation Summit, Feb. 29-Mar. 2, 2016, Washington, D.C.
Zhai, Y. et al. (Mar. 2017) "Scalable-manufactured randomized glass-polymer hybrid metamaterial for daytime radiative cooling," Science 355:1062-1066.
Zhang, X. (Mar. 2017) "Metamaterials for perpetual cooling at large scales," Science 355:1023-1024.
U.S. Appl. No. 16/085,429, filed Sep. 14, 2018.
Supplementary Partial European Search Report, EP Application No. 17760553, dated Oct. 18, 2019, 15 pages.

* cited by examiner
† cited by third party

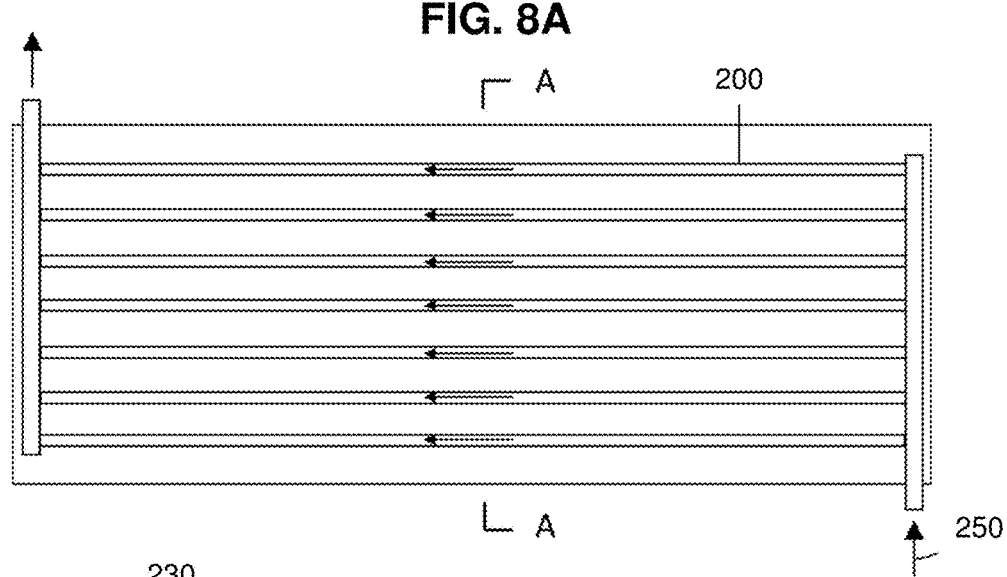
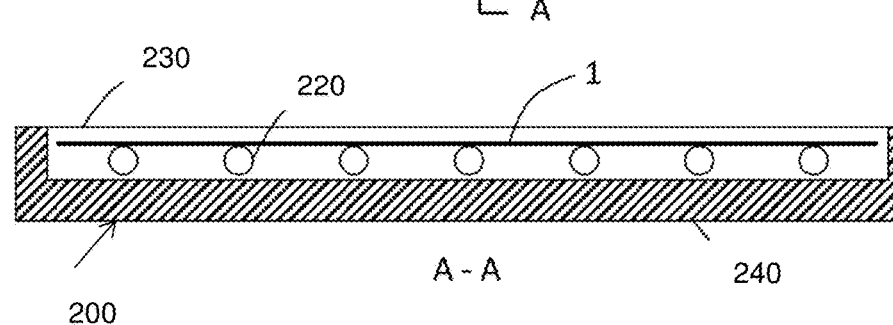

RADIATIVE COOLING STRUCTURES AND SYSTEMS

STATEMENT REGARDING FEDERALLY SPONSORED RESEARCH OR DEVELOPMENT

This invention was made with government support under grant number DE-AR0000580 awarded by the Department of Energy (ARPA-E). The government has certain rights in the invention.

CROSS-REFERENCE TO RELATED APPLICATIONS

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Radiative cooling features the release of heat from an object or surface in the form of thermal radiation, thereby lowering the temperature of the object or surface, or maintaining its temperature at a relatively lower baseline when operating in steady state. The thermal radiation emitted from a black body has a continuous wavelength or frequency spectrum that depends only on the temperature of the surface; most of the thermal radiation emitted by objects near room temperature is in the infrared region(s) of the electromagnetic spectrum.

A wavelength-selective radiative cooling device can emit thermal radiation preferentially in the selected wavelength ranges of the electromagnetic spectrum. For example, a selective radiative cooling device may preferentially emit infrared radiation at wavelengths corresponding to a "window of the atmosphere", also known as an "atmospheric transmission window" or an "atmospheric transparent window". The Earth's atmosphere is practically non-absorbing in these "window" wavelength ranges, such as at 7-13 μm and 16-30 μm. Examples of radiative cooling devices for emission of infrared radiation are described in U.S. Pat. Nos. 2,289,809; 3,043,112; 3,671,286; 4,586,350; and 7,503,971 and U.S. Patent Application Publications US2010/0155043 and US2015/0131023.

BRIEF SUMMARY OF THE INVENTION

In some aspects, the present disclosure relates to polymer-based selective radiative cooling structures which include a wavelength-selective emissive layer of a polymer or a polymer matrix composite material. Exemplary wavelength-selective radiative cooling structures are in the form of a sheet, film or coating and can be viewed as providing a radiative cooling surface. In additional aspects, the disclosure relates to methods for removing heat from a body by selective radiation using polymer-based wavelength-selective radiative cooling structures. Additionally, the disclosure pertains to manufacturing methods for polymer-based radiative cooling structures. The polymer-based solutions for radiative cooling described herein can be cheaper, more effective and/or more easily produced and integrated at application size scales than inorganic multilayer optical coatings.

In some embodiments, the selective radiative cooling structures are selected to limit absorption of solar energy by the selective radiative cooling structure. FIG. 1 illustrates and compares the solar spectrum (AM1.5) and the thermal radiation spectrum for a blackbody at 15° C. through the atmospheric transmission windows. There is a large power density mismatch between the two spectra with relatively large heating power coming from the solar spectrum versus the potential self-cooling by thermal radiation through the atmospheric transmission window. In further embodiments, the selective radiative cooling structures maximize the infrared radiation in one or more atmospheric transmission windows.

In embodiments, the selective radiative cooling structures described herein provide radiative cooling powers greater than 100 W/m$^2$ during the daytime, nighttime, or both. Embodiments can also be selected such that the cooling power at room temperature is in the 20 to 40 W/m$^2$, 40 to 60 W/m$^2$, 60 to 80 W/m$^2$, 80 to 100 W/m$^2$, 100 to 120 W/m$^2$, 120 to 140 W/m$^2$, or 140 to 160 W/m$^2$ range during the daytime, nighttime, or both. In an example, the cooling power is measured for a temperature of 15° C. In an example, the radiative heat flux is measured with an equivalent of 890 W/m$^2$ of direct sunlight incident on the radiative cooling structure. However, in embodiments the radiative cooling structure reflects most of the sunlight due to its wavelength-selective emission which results in a net cooling of 100 W/m$^2$. Elements of the above embodiments can be selected appropriately to tune the cooling power to the desired range for objects of different core temperatures to be cooled.

In an aspect of the present disclosure, the selective radiative cooling structures transmit solar radiation, emit infrared radiation through the atmospheric transparent window and comprise a selectively emissive layer. In embodiments, the selectively emissive layer of the wavelength-selective radiative cooling structure also transmits solar radiation and emits infrared radiation. Such radiative cooling structures can be applied for cooling of solar cells and windows and in radiant ceilings by placing the selective radiative cooling structure in thermal communication with the body to be cooled.

In some embodiments, the selective radiative cooling structure is characterized by an average emissivity ranging from 0.7 to 1 over one or more atmospheric transmission windows. As examples, the average emissivity ranges from 0.7 to 1 over the wavelength range 7 μm to 13 μm, the wavelength range 16 μm to 30 μm or a combination thereof. In additional embodiments, narrower wavelength ranges are applied, such as from 8 μm to 12 μm or from 17 μm to 25 μm. As additional examples, the emissivity ranges from 0.8 to 1, 0.9 to 1, 0.95 to 1 or greater than 0.95 to 1 over the selected wavelength range. In an embodiment, the average emissivity is a hemispherical emissivity averaged over the wavelength range of interest.

In additional embodiments, the wavelength-selective radiative cooling structure is characterized by a low average absorptivity ranging from 0 to 0.2 over a selected wavelength range of the solar spectrum. As additional examples, the absorptivity ranges from 0.15 to 0, 0.1 to 0, 0.05 to 0 or less than 0.05 over the selected wavelength range. FIG. 1 illustrates irradiance as a function of wavelength for the AM1.5 solar irradiance. In embodiments, the absorptivity is averaged over the solar spectrum with wavelength ranging from 0.3 μm to 5 μm or 0.3 μm to 3 μm.

In embodiments, the selectively emissive layer comprises a polymer layer which transmits solar radiation and emits infrared radiation. In embodiments, the polymer layer has low solar absorption, for example, absorption of light in the 300 nm to 5000 nm range less than 20%, less than or equal to 15%, less than or equal to 10% or less than or equal to 5% on average with the lower bound being 0. In further embodiments, the layer may transmit more than 80%, greater than or equal to 85%, greater than or equal to 90% or greater than or equal to 95% of incident solar light, with the upper bound being 100%. In further embodiments, the polymer layer has a high absorptivity (emissivity) in the range 5 μm to 50 μm, such as 0.6 to 1, 0.7 to 1, 0.8 to 1, 0.9 to 1, 0.95 to 1 or greater than 0.95 to 1. In embodiments, the polymer has one or more absorption bands in an atmospheric window and does not show significant adsorption from 0.3 to 3 μm. Suitable polymers include, but are not limited to polyolefins, polymethyl methacrylate (PMMA), polymethylpentene (PMP, also known as 4-methylpentene-1 and poly(4-methyl-1-pentene)), polyethylene (PE), polystyrene (PS), polyethylene terephthalate (PET), polycarbonate (PC), Polytetrafluoroethylene (PTFE), combinations thereof and copolymers thereof. Polymethylpentene is commercially available as TPX™ (Mitsui Chemicals). The basic monomer for TPX™ is poly(4-methyl-1 pentene), but TPX™ includes copolymers of poly(4-methyl-1 pentene) with α-olefins such as 1-pentene, 1-hexene and 1-octene (Fink, J., Handbook of Engineering and Specialty Thermoplastics, Polyolefins and Styrenics, 2010, Scrivener, pp 109-111).

FIG. 2 shows a schematic drawing of an emissive layer 5 which is a sheet of polymer 20. In embodiments, the thickness of the polymer sheet or polymer-based layer can be 5 μm to 3 or more millimeters, from 5 μm to 1 mm, from 5 μm to 500 μm, from 5 μm to 100 μm, from 10 μm to 3 mm, from 100 μm to from 750 μm, from 100 μm to 1000 μm, from 200 μm to 750 μm, from 250 μm to 500 μm or from 500 μm to 1000 μm. In embodiments, the selective radiative cooling structure comprises a selectively emissive layer comprising a polymer wherein the selective radiative cooling structure is characterized by an average emissivity ranging from 0.6 to 1.0 over the wavelength range 7 μm to 13 μm.

In additional embodiments, the selectively emissive layer comprises a layer of a composite material comprising a polymer matrix and a plurality of filler regions (e.g. particles) distributed in the matrix. In embodiments, the polymer transmits solar radiation and emits infrared radiation; exemplary polymers are described above. In embodiments, the polymer has one or more absorption bands in an atmospheric window and does not show significant adsorption in the solar spectrum from 0.3 to 3 μm. In some examples the filler regions are also polymeric, but of a different polymer than the polymer matrix (e.g. the matrix is of a first polymer and the filler is of a second polymer). In other examples the filler regions are non-polymeric such as a non-polymeric dielectric material. In further embodiments, the non-polymer regions can be tailored to decrease solar absorption, increase thermal emission, or otherwise increase the efficiency of radiative cooling for the desired application. In an embodiment, the non-polymer regions (fillers) enhance the radiative cooling performance of the polymer sheet by increasing infrared emissivity, such as via Mie scattering effects and added absorption resonances. In embodiments, the non-polymer material has one or more absorption bands in an atmospheric window and does not show significant adsorption in the solar spectrum from 0.3 to 3 μm. Increased efficiency in these embodiments may allow the polymer-based composite sheets to be higher performing or relatively thinner at the same performance level, compared to an all-polymer counterpart. In an embodiment, the refractive index of the non-polymeric regions is matched or substantially matched to the refractive index of the polymer in the solar spectrum, but is not matched or substantially matched to the refractive index of the polymer in the infrared region(s) of interest In an embodiment, the emissive layer comprises a polymer layer with some volumetric fraction of embedded particles or spheres, as illustrated schematically in FIG. 3A. FIG. 3B shows an exemplary absorption curve (<5% average absorption in solar spectrum) of a polymer layer with embedded non-polymer particles of an embodiment of the present invention (50-μm-thick polymethylpentene film with 5 vol % 8-μm-diameter solid silica microspheres). In embodiments, the dielectric particles are spherical, ellipsoidal, polyhedral, rod-shaped, plate-shaped or irregular in shape. In embodiments, the particles or spheres are from 1 μm to 20 μm in diameter (or effective diameter or characteristic dimension if the particles are non-spherical), 3 μm to 30 μm, 4 μm to 10 μm or from 20 μm to 30 μm. As examples, the diameter or thickness of rod-shaped or plate-shaped particles can be used as the characteristic dimension. In further embodiments, the average or mean size of the particles or spheres falls within the specified range. In further embodiments, the emissive layer may comprise particles with two or more distinct size ranges. In embodiments, the particles or spheres are of a dielectric material. Suitable materials for the particles or spheres include, but are not limited to silica ($SiO_2$), $CaCO_3$, SiC, any type of glass-like materials, and combinations thereof. In embodiments, the volumetric concentration of the encapsulated particles or spheres may be 1% to 15%, 5 to 15%, 1% to 25%, 2% to 25% or 5 to 25%. In embodiments, the polymer matrix of the composite material forms the balance of the composite volume or ranges from 80 to 100% or 95-100% of the composite. In an embodiment, the thickness of the polymer layer is thicker than the effective diameter of the particles or spheres. In embodiments, the polymer or polymer-based layer can be 10 μm to 3 or more millimeters in thickness, from 10 μm to 1 mm, from 10 μm to 500 μm, from 10 μm to 100 μm, from 100 μm to from 750 μm, from 200 μm to 1000 μm, from 200 μm to 750 μm, from 250 μm to 500 μm or from 500 μm to 1000 μm.

In an embodiment, the disclosure provides a wavelength-selective radiative cooling structure, the structure comprising a selectively emissive layer comprising a polymer and a plurality of dielectric particles dispersed in the polymer, the volume percentage of the dielectric particles ranging from 2% to 25% and the particles being characterized by an average size ranging from 3 μm to 30 μm wherein the polymer, the plurality of dielectric particles, or the combination are characterized by having one or more absorption bands in an atmospheric transparent window and being transparent to radiation from 0.3 to 3 μm. As an example, the wavelength-selective radiative cooling structure is characterized by a solar absorptivity from 0 to 0.1 and an average emissivity ranging from 0.6 to 1.0 over the atmospheric transparent window. As an example, the polymer is a 4-methyl-1-pentene polymer or a 4-methyl-1-pentene copolymer. As an additional example, the particles are silica microspheres or micro rods.

In an embodiment, the disclosure provides a selective radiative cooling structure, the structure comprising a selectively emissive layer comprising a polymer and a plurality of dielectric particles dispersed in the polymer, the volume percentage of the dielectric particles in the selectively emissive layer ranging from 1% to 25% or 2% to 25% or 1% to 15% and the particles being characterized by an average size ranging from 1 µm to 20 µm or from 3 µm to 30 µm
wherein the selective radiative cooling structure is characterized by an average emissivity ranging from 0.6 to 1.0 over the wavelength range 7 µm to 13 µm. In further embodiments, the selective radiative cooling structure is characterized by an average absorptivity from 0 to 0.1 or 0 to 0.2 over the wavelength range 0.3 µm to 3 µm. In additional embodiments, the selective radiative cooling structure is in sheet form. For example, the sheet may have a width or length on the scale of centimeters or meters.

In additional embodiments, one or more additional sheets or layers of material are coupled to the polymer-based radiative cooling sheet. In embodiments, the additional layer(s) have anti-reflection, water-proofing, weather-resisting, UV-light protection, wear-resistant or similar properties. Materials that may compose or be included in these sheets include a solar transparent and weather-resistant polymer, such as PET, or a dielectric material, such as $MgF_2$, and combinations thereof. In some examples, at least one of these additional layers is infrared absorbing while in other examples at least one of these additional layers is transparent to infrared light. Combinations include multi-layered structures of polymer and dielectric materials that are transparent to infrared light. In some embodiments, the thickness of a layer that protects from UV-light exposure and/or weather is from 10 nm to 10 µm, 100 nm to 10 µm, from 10 nm to 1 µm, from 100 nm to 1 µm or from 500 nm to 10 µm.

In further aspects, the present disclosure provides selective radiative cooling structures which reflect solar radiation and emit infrared radiation and comprise a selectively emissive layer. In embodiments, the wavelength-selective radiative cooling structure further comprises a reflective layer in contact with the selectively emissive layer. In further embodiments, the reflective layer is reflective for solar radiation. As previously described, the selective emissive comprises a polymer and in some examples further comprises filler particles.

In embodiments, the disclosure provides a selective radiative cooling structure comprising a selectively emissive layer and solar-reflective layer in contact with the selectively emissive layer wherein the selective radiative cooling structure is characterized by a solar reflectivity ranging from 0.9 to 1. For example, the solar reflectivity is measured over the wavelength range 0.3 µm to 3 µm. In embodiments, the solar-reflective layer comprises a metal film or a metal substrate. For example, the selectively emissive layer is laid on a solar-reflective metal substrate which is a structural element of the body to be cooled. As examples, the metal film is characterized by an average thickness from 30 nanometers to 1000 nanometers and the metal substrate is characterized by an average thickness from 1000 nanometers to 10 cm. In embodiments, the selectively emissive layer is characterized by a solar transmissivity ranging from 0.7 to 1. As previously described, the selective emissive comprises a polymer and in some examples further comprises filler particles.

FIG. 4A schematically illustrates a single reflective layer 40 in contact with a selectively emissive layer 5 which includes non-polymer particles 30 in a matrix of polymer 20. For example, this reflective layer is metallic or of any other solar reflective material. In embodiments, the metallic reflective layer includes silver, aluminum, gold, or copper. In embodiments, the layer is from 20 nm to 300 nm or from 100 nm to 1 µm. These embodiments may be particularly suitable for any applications wherein the object targeted for cooling benefits from reduced absorption of incident solar radiation.

Additional embodiments of the present disclosure include one or more additional layers of material coupled to the selectively emissive layer and/or reflective layer. As examples, an anti-reflection layer, a protection layer or a combination thereof is coupled to one side of the emissive layer while a reflective layer or a combination of a barrier layer and a reflective layer is coupled to the other side of the emissive layer. Exemplary embodiments are shown in FIG. 4B through 4E. FIG. 4B illustrates an anti-reflection layer 50 in contact with the selectively emissive layer 5, with a protection layer 60 in contact with the anti-reflection layer. As shown in FIG. 4C a barrier layer, a layer between the selectively emissive layer 5 and the reflective layer 40 is included in some embodiments; the embodiment of FIG. 4C also includes a protection layer 60 in contact with the selectively emissive layer 5. Suitable materials for the barrier layer include, but are not limited to, a dielectric materials or a solar transparent material. Suitable dielectric materials include, but are not limited to metal oxide materials such as $TiO_2$, $SiO_2$ and $Al_2O_3$. For example, the barrier layer is from 5 nm to 100 nm. In embodiments, a barrier layer protects the metallic reflective layer from corrosion due to gas or water molecule penetration (e.g. from the top polymer layers) and/or improves the metal adhesion. FIG. 4D shows an additional embodiment, wherein a copper or otherwise selectively conductive material layer contacts the metallic reflective layer; the layer of selectively conductive material is included for enhanced thermal coupling to the object targeted for cooling. FIG. 4E shows an embodiment with a protection layer 60 and a barrier layer 70 in contact with the selectively emissive layer 5. An anti-reflective layer 50 is in contact with the protection layer 60 and a metal reflective layer 40 is in contact with the barrier layer 70.

These embodiments may be particularly suitable for any applications wherein the object targeted for cooling benefits from reduced absorption of incident solar radiation. In embodiments, the additional layer(s) have anti-reflection, water-proofing, weather-resisting, UV-light protection, wear-resisting or similar properties. Materials that may compose or be included in these sheets include a solar transparent, weather-resistant polymer, such as PET, or a dielectric material, such as $MgF_2$, and combinations thereof. Combinations include multi-layered structures of polymer and dielectric materials.

These layers can be present in addition to the reflective layer (see for example FIGS. 4B, 4C, 4D and 4E). In embodiments with a reflective layer, the additional layer or layers may be on the opposite side of the polymer layer from the reflective layer. Materials that may compose or be included in these sheets include any solar transparent and weather-resistant polymer, such as PET, or dielectric material, such as $MgF_2$, or multiple-layered structure of these polymer and dielectric materials.

The present disclosure further relates to methods for removing heat from a body by selective thermal radiation using polymer-based selective radiative cooling structures. In some embodiments, the polymer-based selective radiative cooling structure does not include a reflective layer and the selectively emissive layer is in thermal communication with a body to be cooled. As examples, the selectively emissive layer is placed in direct contact with the body or may be attached with an adhesive.

In some embodiments, the disclosure provides methods for removing heat from a body by selective thermal radiation, the methods comprising the steps of:
a. placing a selective radiative cooling structure in thermal communication with a surface of the body, the selective radiative cooling structure comprising a selectively emissive layer comprising a polymer, wherein the selectively emissive layer is in thermal communication with the body and the selective radiative cooling structure is characterized by an average emissivity ranging from 0.6 to 1.0 over the wavelength range 7 μm to 13 μm;
b. transferring heat from the body to the selective radiative cooling structure; and
c. radiating heat from the selectively emissive layer of the selective radiative cooling structure.

In an example, the selective radiative cooling structure is characterized by a solar absorptivity from 0 to 0.2 over the wavelength of 0.3 μm to 3 μm. In some embodiments, the selectively emissive layer further comprises a plurality of dielectric particles dispersed in the polymer as described herein. For example, the volume percentage of the dielectric particles in the selectively emissive layer ranges from 2% to 25% and the particles are characterized by an average size ranging from 3 μm to 30 μm. As examples, the body is a solar panel, the roof of an automobile, or a storage structure for cold energy, food or oil.

In additional embodiments, the disclosure provides methods for removing heat from a body by selective thermal radiation, the methods comprising the steps of:
a. placing a selective radiative cooling structure in thermal communication with a surface of the body, the selective radiative cooling structure comprising a selectively emissive layer comprising a polymer and the selectively emissive layer wherein the selective radiative cooling structure are characterized by a solar absorptivity from 0 to 0.2 over the wavelength of 0.3 μm to 3 μm and an average emissivity ranging from 0.7 to 1.0 over the wavelength range 7 μm to 13 μm;
b. transferring heat from the body to the selective radiative cooling structure; and
c. radiating heat from the selectively emissive layer of the selective radiative cooling structure.

In examples, the selectively emissive layer is in thermal communication with the body by directly contacting the body or by being attached to the body by an adhesive layer. In some embodiments, the selectively emissive layer further comprises a plurality of dielectric particles dispersed in the polymer as described herein.

In some embodiments, a solar transparent and infrared emissive selective radiative cooler can be employed to cool down a solar cell. The polymer-based radiative cooler sheet is directly attached to the top of solar cell as shown in FIG. 5. It does not affect solar cell performance since it is transparent for solar incidence. However, solar cell temperature is reduced due to the polymer sheet's infrared emissive effect to the low-temperature sky, which results in increasing the efficiency and the reliability of solar cells. In FIG. 5, labels are as follows: 100 solar cell; 1 radiative cooling sheet; 3 solar incidence radiation; 4 radiative cooling flux from infrared-emissive radiative cooling sheet to the sky In other embodiments, a solar transparent and infrared emissive selective radiative cooler can be attached to a radiant ceiling panel surface. The amount of thermal energy that is transferred from the room via thermal radiation is dependent on the emissivity of the radiant ceiling panel surface. A conventional radiant ceiling panel surface usually has an emissivity of 0.9-0.95. When a selective radiative cooling structure having an emissivity greater than or equal to 0.95 is attached to a conventional radiant ceiling panel surface (see FIG. 6), it is capable of providing higher radiative cooling efficiency between the radiant ceiling panel and room. FIG. 6: 150 building; 320 cold storage tank; 1 radiative cooling sheet attached to radiant ceiling; 6 building internal heat gain; 7 radiative flux from room to radiant ceiling; 8 convective heat transfer from room air to radiant ceiling The present disclosure further relates to methods for removing heat from a body by selective thermal radiation using polymer-based wavelength-selective radiative cooling structures including a reflective layer. As examples, the reflective layer is attached to the body with an adhesive or is attached to a thermally conductive layer which is then attached to the body.

In additional embodiments, the disclosure provides methods for removing heat from a body by selective thermal radiation, the methods comprising the steps of:
a. placing a selective radiative cooling structure in thermal communication with a surface of the body, the selective radiative cooling structure comprising a selectively emissive layer comprising a polymer and a solar-reflective layer in contact with the selectively emissive layer, wherein the selectively emissive layer is in thermal communication with the body and the selective radiative cooling structure is characterized by an average emissivity ranging from 0.6 to 1.0 over the wavelength range 7 μm to 13 μm;
b. transferring heat from the body to the selective radiative cooling structure; and
c. radiating heat from selectively emissive layer of the selective radiative cooling structure.

As previously described the solar reflective layer in examples is a metal film or a metal substrate. Further, in some embodiments, the selectively emissive layer further comprises a plurality of dielectric particles dispersed in the polymer as described herein. For example, the volume percentage of the dielectric particles in the selectively emissive layer ranges from 2% to 25% and the particles are characterized by an average size ranging from 3 μm to 30 μm. As examples, the body is a portion of a building or the roof of a structure. As additional examples, the body is a cold collection device such as a passive thermosiphon or an active microchannel array and wherein a heat transfer fluid circulates inside the body.

In an embodiment, the disclosure provides a method for removing heat from a body by selective thermal radiation, the method comprising the steps of:
a. placing a selective radiative cooling structure in thermal communication with a surface of the body, the selective radiative cooling structure comprising a selectively emissive layer and a solar-reflective layer in contact with the selectively emissive layer, wherein the selectively emissive layer comprises a polymer and the solar spectrum reflective layer comprises a metal film, the solar spectrum reflective layer being in thermal communication with the body and the selective radiative cooling structure being characterized by a solar absorptivity from 0 to 15% over wavelength ranging from 0.3 μm to 3 μm and an average emissivity ranging from 0.6 to 1.0 over the wavelength ranging from 7 μm to 13 μm;
b. transferring heat from the body to the selective radiative cooling structure; and
c. radiating heat from the selectively emissive layer of the selective radiative cooling structure.

As previously described the solar reflective layer in examples is a metal film or a metal substrate. Further, in some embodiments, the selectively emissive layer further comprises a plurality of dielectric particles dispersed in the polymer as described herein.

A solar-reflective and infrared emissive polymer-based radiative cooling sheet can be used to provide passive cooling effect for buildings (see FIG. 7A) and automobiles (see FIG. 7B). The radiative cooling sheet is directly attached to a building or a car roof for cooling, with the reflective layer oriented towards the building or car roof. The cooling effect comes from two aspects: 1) a large amount (e.g. 90%) of incident solar radiation can be reflected by the radiative cooling sheet's metal reflective layer, which greatly reduces the heat gain from solar radiation; 2) infrared radiative emission (e.g. 100 W/m$^2$) from the radiative cooling sheet to the sky. This application is particularly suitable for passive cooling of light-weight buildings in tropical and sub-tropical regions. FIG. 7A: 150 building; 3 solar incident radiation; 4 radiative cooling flux from radiative cooling sheet to the sky; 1 radiative cooling sheet attached to roof; 6 building internal heat gain; 9 the reflected solar radiation. FIG. 7B: 180 car; 1 radiative cooling sheet attached to car roof The polymer-based radiative cooling sheets disclosed herein can also be used in combination with a cold storage system. For example, the radiative cooling sheet is incorporated in a cold collection device (i.e., cold collector) in which cold thermal energy from the radiative cooling sheet is transferred to heat transfer fluid running inside the cold collector.

In some embodiments, the present disclosure provides a cold collection system comprising
  a. a cold storage tank comprising a heat exchanger;
  b. a plurality of cold collection devices, each cold collection device configured to be in fluidic communication with the heat exchanger of the cold storage tank; and
  c. a plurality of selective radiative cooling structures, each selective radiative cooling structure being in thermal communication with the surface of one of the plurality of cold collection devices and each selective radiative cooling structure comprising a selectively emissive layer comprising a polymer, wherein the selectively emissive layer of each selective radiative cooling device is in thermal communication with one of the plurality of cold collection devices and each selective radiative cooling structure is characterized by an average emissivity ranging from 0.6 to 1.0 over the wavelength range 7 μm to 13 μm.

For example a cold collection device is configured to be in fluidic communication with the heat exchanger when a flow conduit connects the cold collection device and the heat exchanger. Such a flow conduit allows a heat exchange fluid (e.g. a liquid) to transfer cold from the cold collection device to the heat exchanger. In examples, the cold collection device is a passive thermosiphon or an active microchannel array. In embodiments, each cold collection device is in contact with at least one radiative cooling structure.

In embodiments, a cold collection device comprises a selective radiative cooling structure as described herein configured for thermal communication with a thermal coupling element which is additionally configured for thermal communication with a plurality of conduits for flow of a heat transfer fluid. FIG. 8A illustrates an assembly of cold collection devices 200 while FIG. 8B illustrates a cross-section along A-A. As illustrated in FIGS. 8A and 8B, the cold collector 200 includes radiative cooling sheet 1 coated on a metal sheet to provide radiative cooling power. In this embodiment, the radiative cooling sheet is solar-reflective and infrared-emissive. The cold energy is then transferred from the radiative cooling sheet to heat transfer fluid circulating through tubes 240. The tubes are attached (e.g. welded) to the metal sheet with good thermal contact. After passing through the cold collector, the heat transfer fluid is cooled. The cold collector is insulated with thermal insulation material 240 at the bottom and sides. At the top of the cold collector, a polymer cover 230 is used to prevent convective thermal energy loss to ambient air. FIGS. 8A and 8B: 1 radiative sheet cooling (coated on metal sheet in this figure); 220 tube; 230 cover; 240 insulation material; 250 heat transfer fluid. The cold collection device shown in FIGS. 8A and 8B is an active cold collection device that uses a pump to circulate water through it. Active cold collection devices also include microchannel arrays.

Passive cold collection devices can also be used. A passive thermosiphon type cold collection device is depicted in FIGS. 8C and 8D and can collect cold thermal energy automatically. FIGS. 8C and 8D give a 3D view and a side view of the thermosiphon respectively. It includes a flat channel 260 which provides a panel (e.g. of polycarbonate) where the solar reflective and infrared emissive radiative cooling sheet can be laminated on, a water collection tube 270, a return pipe 280 and a local cold storage 290 that can temporary store cold thermal energy. The thermosiphon is filled with a heat transfer fluid (e.g. water). When the radiative cooling sheet is working, it cools down the heat transfer fluid inside the flat channel. The decrease of fluid temperature drives the fluid to move downward by natural convection. The heat transfer fluid then flows into water collection tube, retune pipe, and finally the local cold storage. Heat transfer fluid circulates inside the thermosiphon due to the radiative cooling sheet. Cold energy is stored in local cold storage automatically without the assistance of an external device. This is the cold charging process. For cold discharging process, an external pump will bring the cold energy inside local cold storage to places where the stored cold energy can be used.

A cold collection device can be used to provide cooling for buildings. In general, internal heat gain of buildings includes lighting, equipment and human body heat dissipation. FIG. 9 shows an active building cooling system with roof-integrated cold collector. The cold thermal energy is collected and stored in a cold storage tank 320 with a heat exchanger inside. The working fluid flowing between cold collector and cold storage tank is driven by a pump. The cooled water inside cold storage tank is then circulated through the radiant ceiling by another pump. The radiant ceiling cools down room temperature through both radiation and convection mechanisms. The cooling system shown in FIG. 9 can either work independently, or in combination with a conventional air-conditioning system to reduce electric energy consumption. This cooling system is suitable for both residential and commercial buildings. The cold collection device used in this application can be either an active or a passive type. FIG. 9: 150 building; 200 roof-integrated cold collection device including radiative cooling sheet; 4 radiative cooling flux from cold collection device to the sky; 320 cold storage tank; 350 pump; 360 heat exchanger; 160 radiant ceiling; 6 building internal heat gain; 7 radiative flux from room to radiant ceiling; 8 convective heat transfer from room air to radiant ceiling.

A cold collection device can also be used to provide supplemental cooling for power plant condenser (see FIG. 10A). In an embodiment, the cooling water coming out of power plant enters an air-cooled condenser to get cooled by using ambient air. However, the performance of the air-cooled condenser is dictated by ambient dry bulb temperature that is subject to large temperature excursions. Power plant efficiency is dependent on the cooling water temperature that enters the power plant condenser. Lower cooling water temperature leads to higher efficiency. Under these circumstances, if the outlet cooling water temperature from the air-cooled condenser meets the power plant energy efficiency requirement, it goes directly back to the power plant condenser through the bypass. However, if not, the cooling water can be further cooled by a cold storage tank that has a temperature lower than the ambient and is cooled by using radiative cooling structure. As shown, heat transfer between cooling water and the cold storage tank is through a heat exchanger. Multiple cold storage tanks are connected in parallel and are used in series. Cold storage tank has two working modes, namely cold charging and cold discharging. Once a cold storage tank is fully discharged (i.e. cannot be used to cool down the cooling water any more), it switches to cold charging mode. The cold charging mode is driven by a pump that connects one cold storage tank with multiple cold collection devices. The multiple cold collectors that emit radiative flux to the sky are connected in parallel. In an embodiment, the cold collection device used is the active cold collector shown in FIG. 8A. The pump (i.e. 350) works continuously in this application. FIG. 10A: 200 Cold collection device; 4 radiative flux to the sky; 350 pump; 320 cold storage tank; 360 heat exchanger; 406 valve; 407 pump; 408 ambient air; 409 air-cooled condenser (ACC); 410 power plant condenser; 411 power plant working fluid from turbine; 412 bypass For the radiative cooling system depicted in FIG. 10A, the thermosiphon shown in FIG. 8C also can be used as cold collection device. Under this circumstance, since thermosiphon can automatically collects cold thermal energy, the pump (i.e. 350) will work intermittently. An operating schedule is needed for the system, an example of which is given in FIG. 10B. FIG. 10B shows a 12-hour operating schedule for a single cold storage tank. The cold storage tank has one charging-discharging cycle and the thermosiphon has 10 charging-discharging cycles during this 12-hour period. The thermosiphon cools down the heat transfer fluid inside local cold storage. Once local cold storage gets cooled, the pump (i.e. 350) will start for a short period of time (e.g. 3-5 mins) and transfer that cold energy to the cold storage tank. The cold storage tank gets cooled after 10 times of charging processes. One cold storage tank may have hundreds of thermosiphons connected to it.

In further embodiments, the present disclosure provides methods for making a selective radiative cooling structure, the methods comprising the steps of:
a. extruding a feed material comprising polymer through a die to form a film or sheet, wherein the polymer is characterized by an absorptivity of 0.6 to 1 in the range 5 µm to 50 µm; and
b. cooling the film or sheet.

In an example, the polymer portion of the feed material is molten as it passes through the die and the polymer portion of the film or sheet is solidified in step b. In additional embodiments the feed material further comprises a plurality of dielectric particles, the volume percentage of the dielectric particles ranging from 2% to 25% and the particles characterized by an average size ranging from 3 µm to 30 µm and the film or sheet is a composite film. Exemplary polymers and particles for radiative cooling structures are described elsewhere herein. In embodiments, the polymer-based sheet of the radiative cooling structure can be 10 µm to 3 millimeters, from 10 µm to 1 mm, from 10 µm to 500 µm, from 10 µm to 100 µm, from 100 µm to from 750 µm, from 200 µm to 1000 µm, from 200 µm to 750 µm, from 250 µm to 500 µm or from 500 µm to 1000 µm in thickness.

FIG. 11 shows a schematic of an extrusion or die-casting system with rollers. In this embodiment the polymer feed 505 is fed to the extruder 510 and the melted material(s) are extruded and cast through the die 520 onto a pick-up roller 530. The pick-up roller may be chilled to accelerate hardening of the polymer sheet 540. An additional roller 550 may be coupled to the pick-up roller, to additionally aid in hardening of the sheet and optionally add thickness-control by pressing. The polymer-based films 540 produced may either be taken from the extrusion line as-is, or wrapped on additional rollers for storage and further use. Sheets as wide as 1 to 3 meters and up to kilometers in length can be produced in this manner.

In some embodiments, once a polymer sheet has been produced, an additional material sheet or sheets such as those that have been discussed can be coated or deposited with an additional layer of material e.g., a protective or barrier sheets and/or reflective sheet. Examples of additional layers of material useful in radiative cooling devices are described above. In one embodiment, a metal reflective sheet is implemented by physical vapor deposition, such as sputtering, thermal or electron-beam evaporation, or spraying method; or chemical deposition methods, such as solution synthesis, electro-chemical metallization, or atomic layer deposition. FIG. 12 shows a schematic drawing of a web coating system for physical vapor deposition, including film 540 and two rollers 560a and 560b. The polymer film may be pre-treated by plasma or ion beams to increase polymer surface adhesion before it gets into the deposition zone, where barrier, reflective, and/or thermal coupling layers can be deposited. These layers can be deposited via any of the method described above in the deposition zone of the web coater. The deposition apparatus is indicated by 570. Alternative and optional layers as aforementioned including antireflection coatings, barrier layers, thermal coupling layers, and UV protection layers can be prepared in similar approaches. In alternative embodiments a reflective or barrier layer(s) can be produced first, and the polymer or polymer-based sheet applied to this layer or layers.

BRIEF DESCRIPTION OF THE DRAWINGS

FIGS. 8A and 8B: FIG. 8A: schematic illustration of a radiative cooling structure in contact with multiple cold collection devices and FIG. 8B: cross section through FIG. 8A along A-A.

FIG. 8C: schematic illustration of a thermosiphon that can be used in contact with the radiative cooling structure to collect cold enabled by radiative cooling structure and FIG. 8D: side view of the thermosiphon.

DETAILED DESCRIPTION OF THE INVENTION

Figure 1:
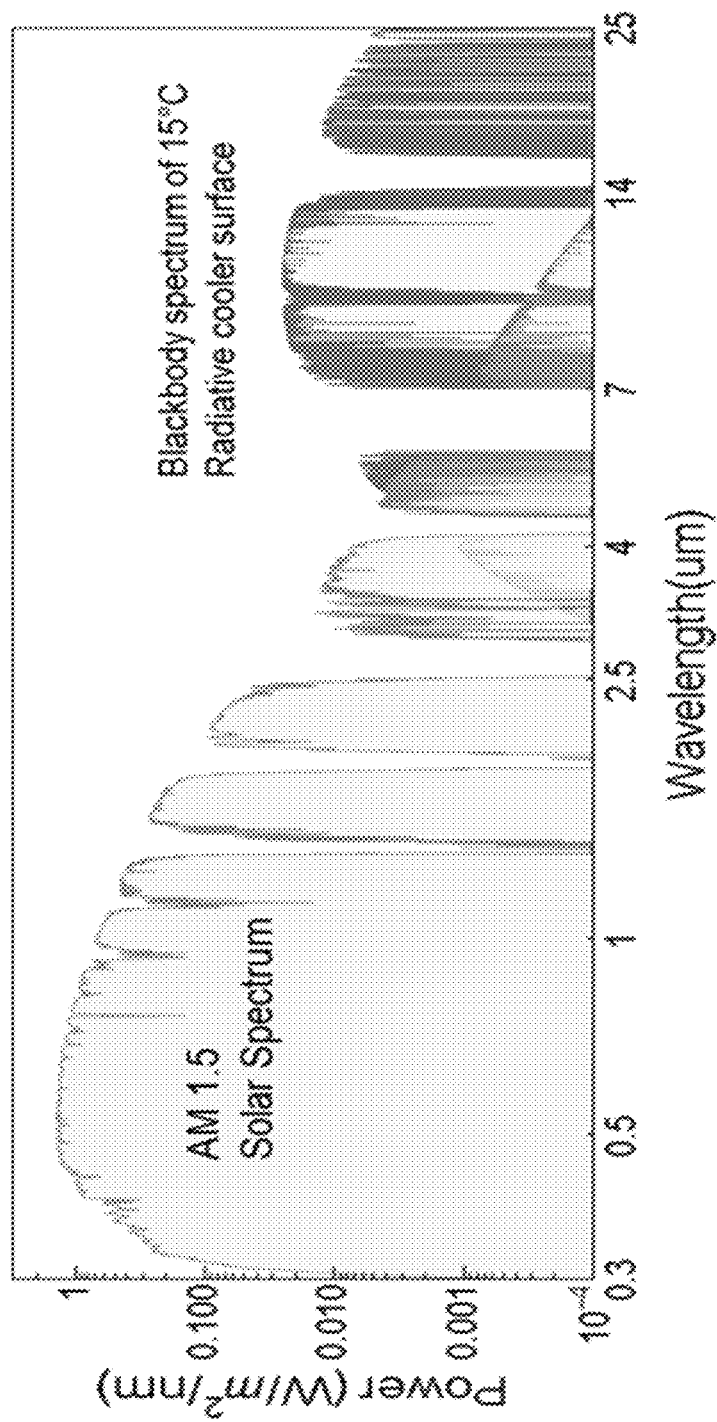
FIG. 1: spectral irradiance of AM1.5 on earth surface and radiation spectrum of a black body surface at 15° C. through the atmospheric transparent window.
Figure 2:
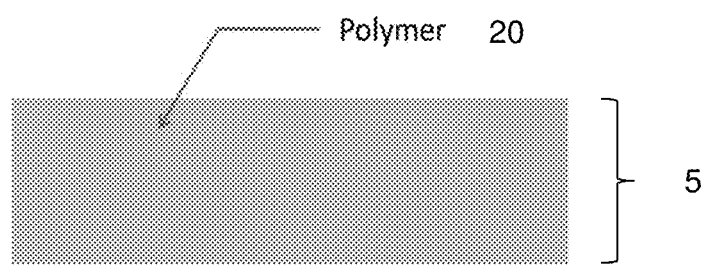
FIG. 2: schematic illustration of an emissive layer 5 of polymer 20.
Figure 3A:
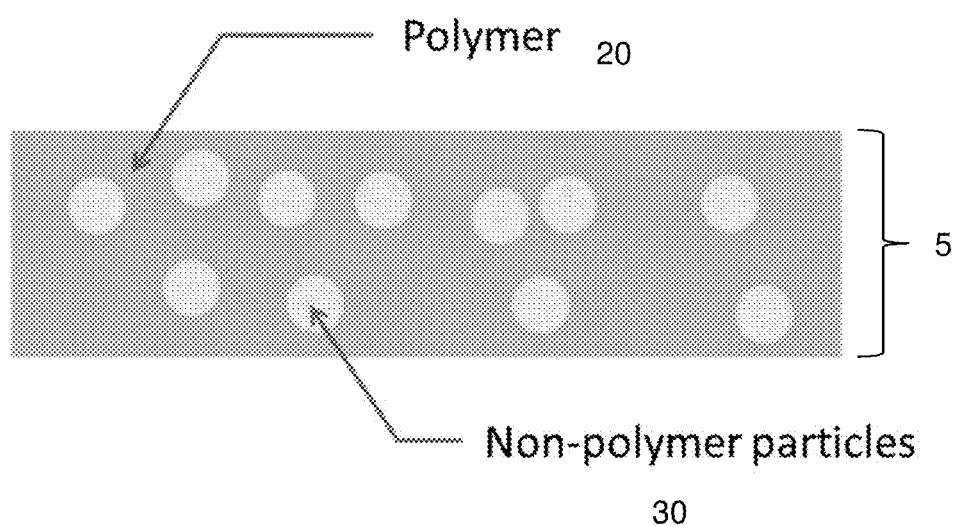
FIG. 3A: schematic illustration of an emissive layer 5 including polymer 20 including particles dispersed in polymer matrix 30.
Figure 3B:
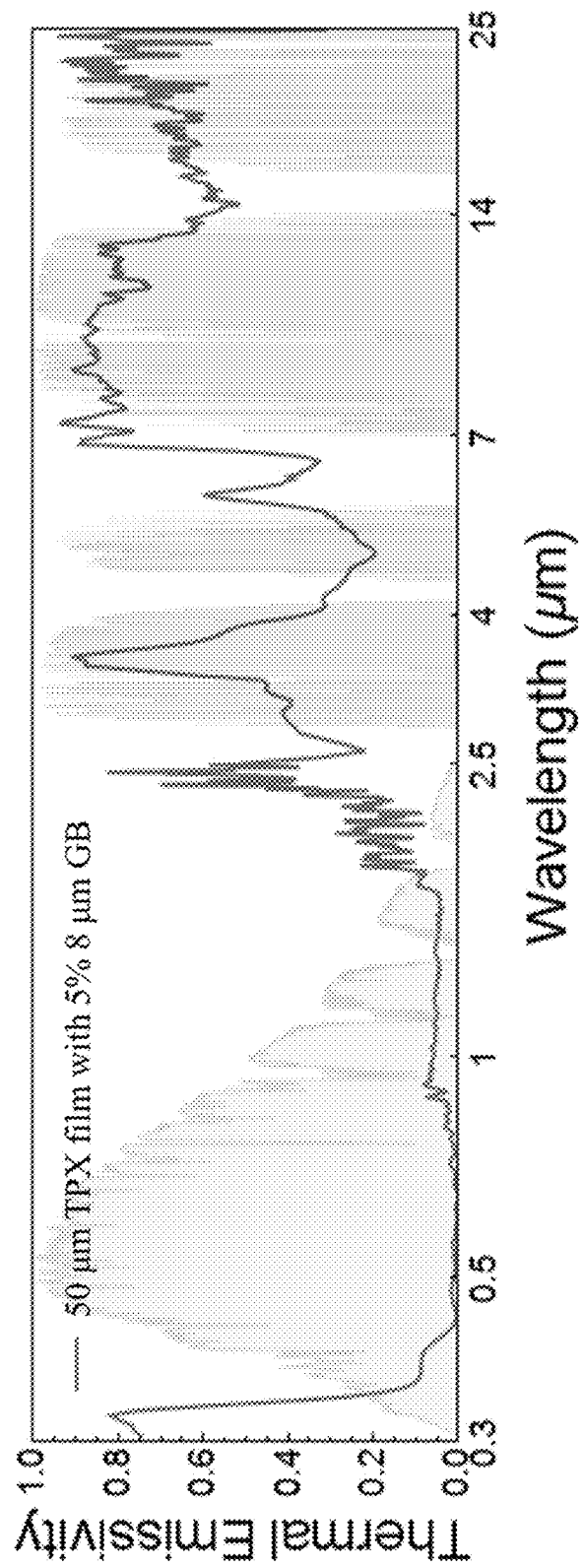
FIG. 3B shows the absorptivity/emissivity as a function of wavelength for a 50-µm-thick polymethylpentene film with 5% 8-µm-diameter solid silica microspheres.
Figure 4A:
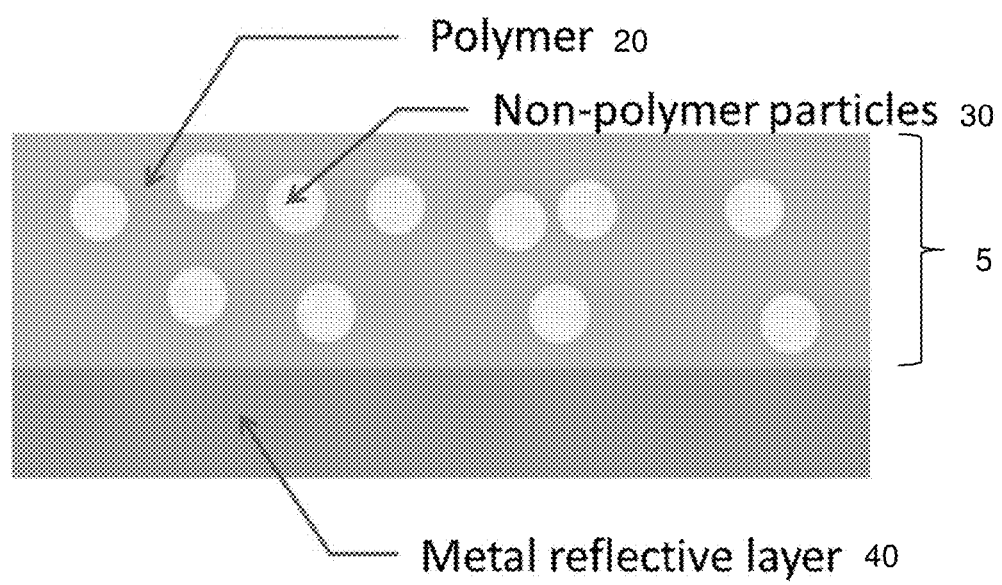
FIG. 4A: schematic illustration of an emissive layer 5 including polymer 20 and particles 30 in contact with metal reflective layer 40.
Figure 4B:
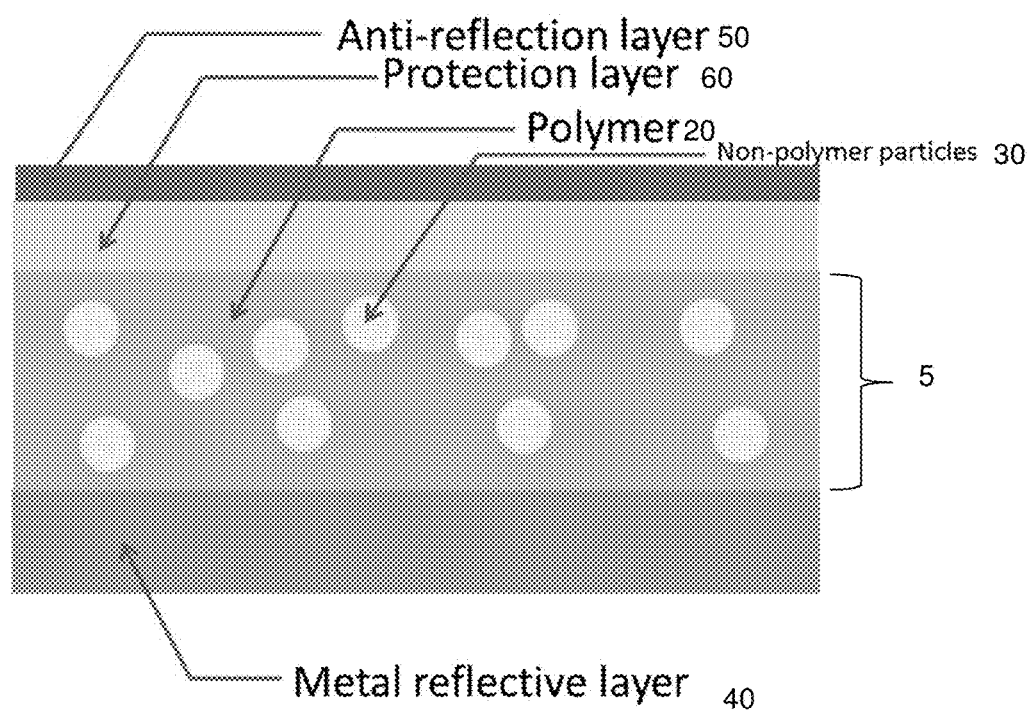
FIG. 4B: schematic illustration of an emissive layer 5 including polymer 20 and particles 30; one face of the emissive layer is in contact with metal reflective layer 40 and the other face of the emissive layer is in contact with an anti-reflection layer 50, which in turn is in contact with a protection layer 60.
Figure 4C:
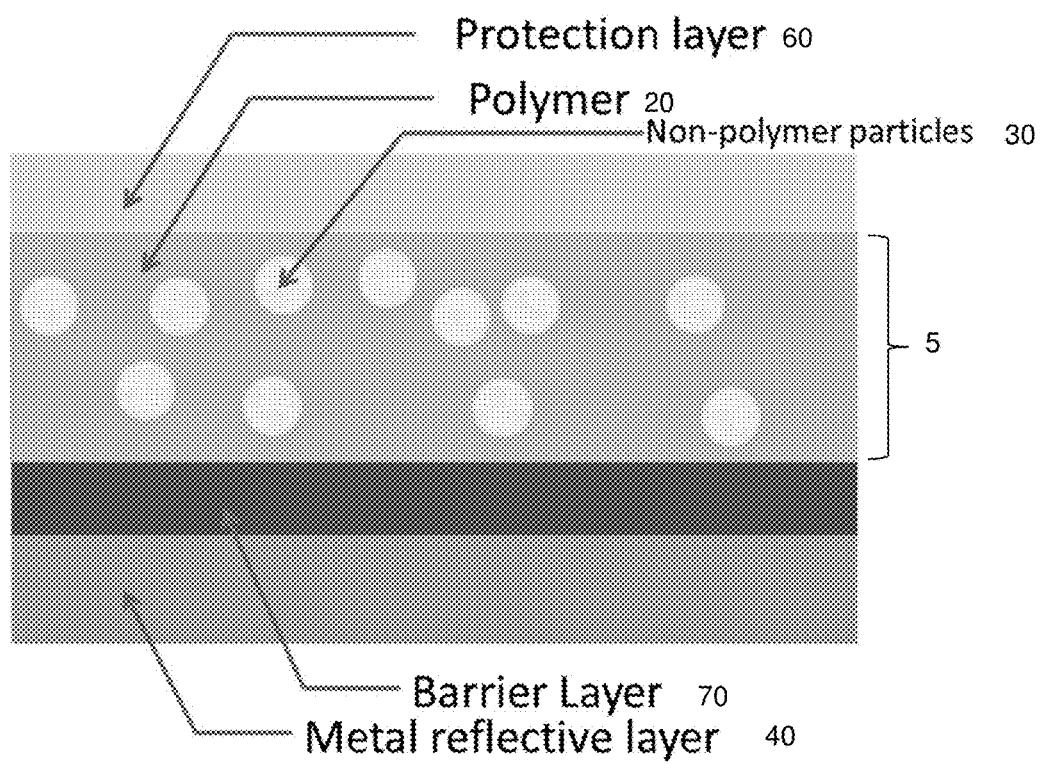
FIG. 4C: schematic illustration of an emissive layer 5 including polymer 20 and particles 30; one face of the emissive layer is in contact with a barrier layer 70, which in turn is in contact with a metal reflective layer 40 and the other face of the emissive layer is in contact with a protection layer 60.
Figure 4D:
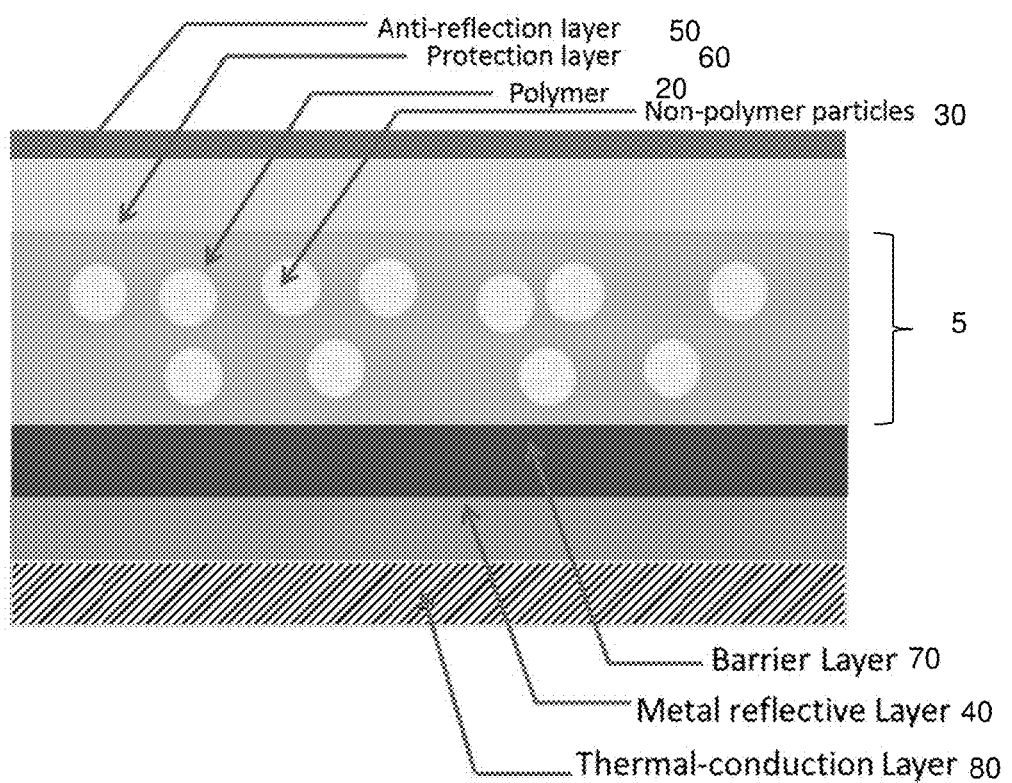
FIG. 4D: schematic illustration of an emissive layer 5 including polymer 20 and particles 30; one face of the emissive layer is in contact with a barrier layer 70, which in turn is in contact with a metal reflective layer 40, which in turn is in contact with a thermal-conduction layer and the other face of the emissive layer is in contact with an anti-reflection layer 50, which in turn is in contact with a protection layer 60.
Figure 4E:
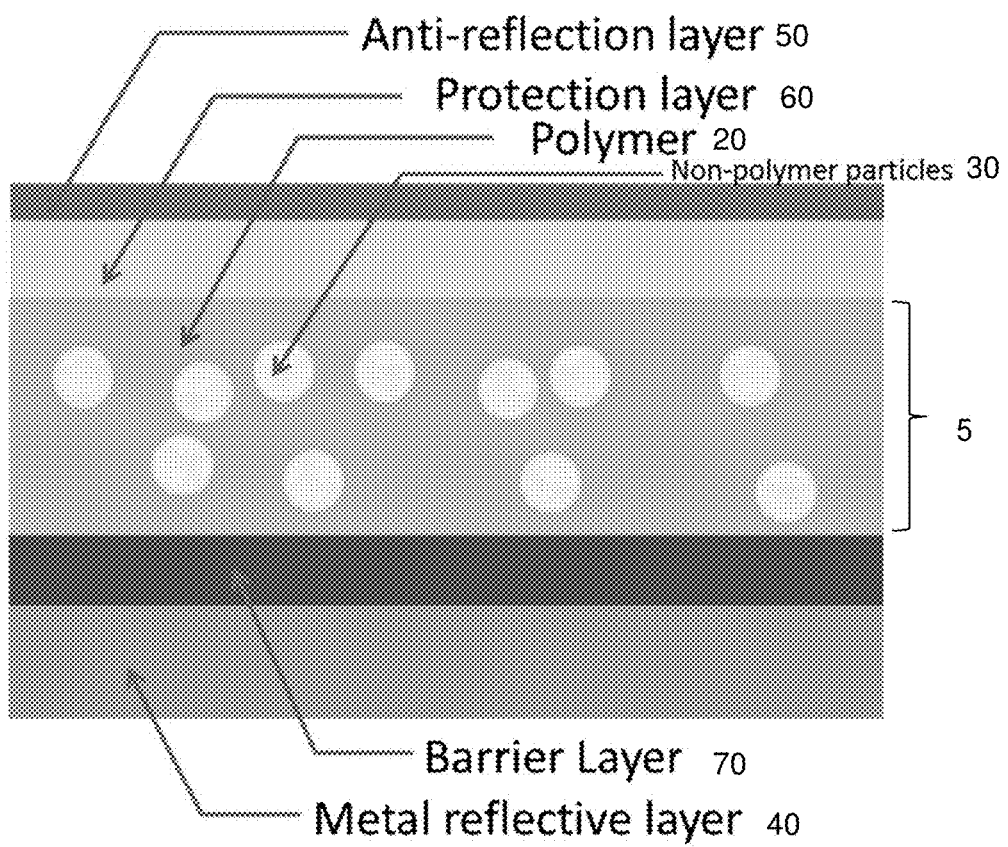
FIG. 4E: schematic illustration of an emissive layer 5 including polymer 20 and particles 30; one face of the emissive layer is in contact with a barrier layer 70, which in turn is in contact with a metal reflective layer 40 and the other face of the emissive layer is in contact with an anti-reflection layer 50, which in turn is in contact with a protection layer 60.
Figure 5:
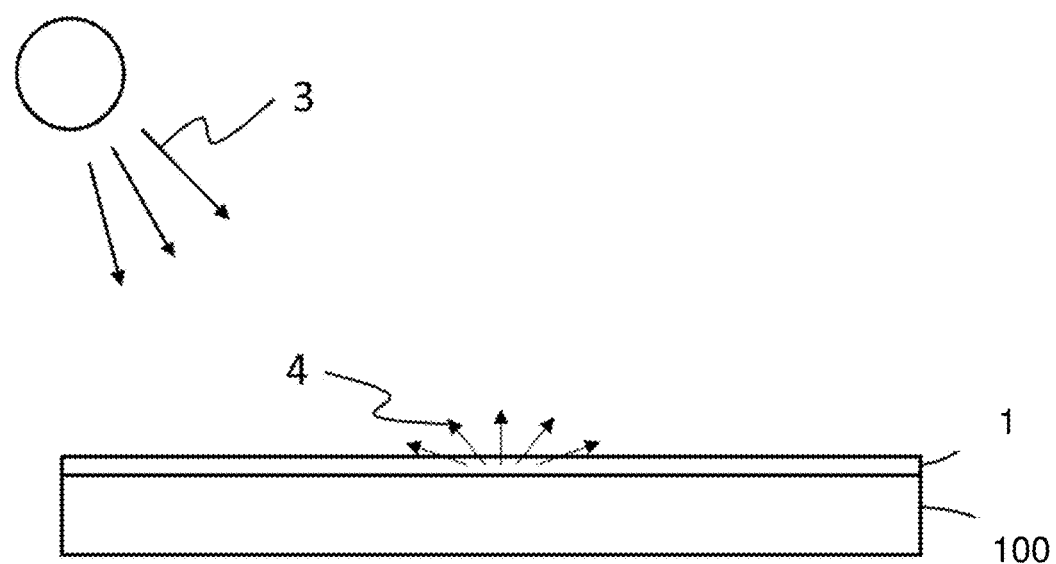
FIG. 5: schematic illustration of a radiative cooling sheet directly attached to the top of a solar cell.
Figure 6:
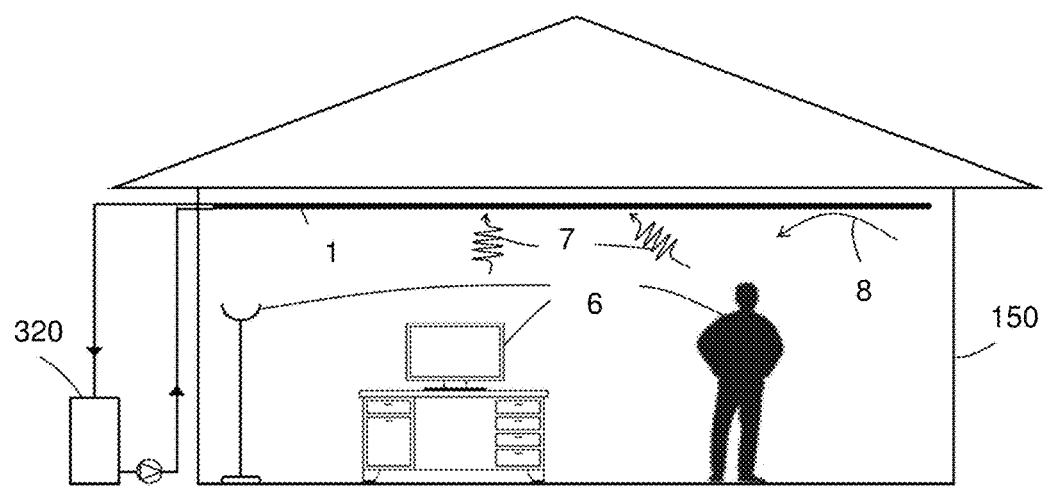
FIG. 6: schematic illustration of a radiative cooling sheet directly attached to a radiant ceiling panel.
Figure 7A:
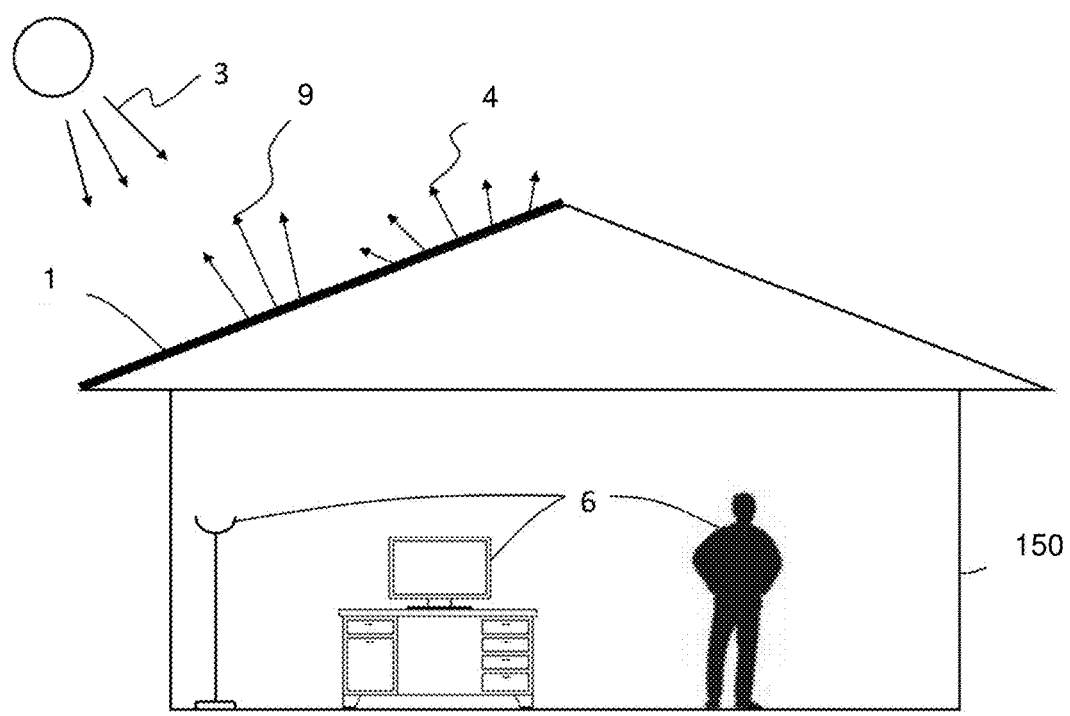
FIG. 7A: schematic illustration of a radiative cooling sheet with reflective layer directly attached to the roof of a built structure.
Figure 7B:
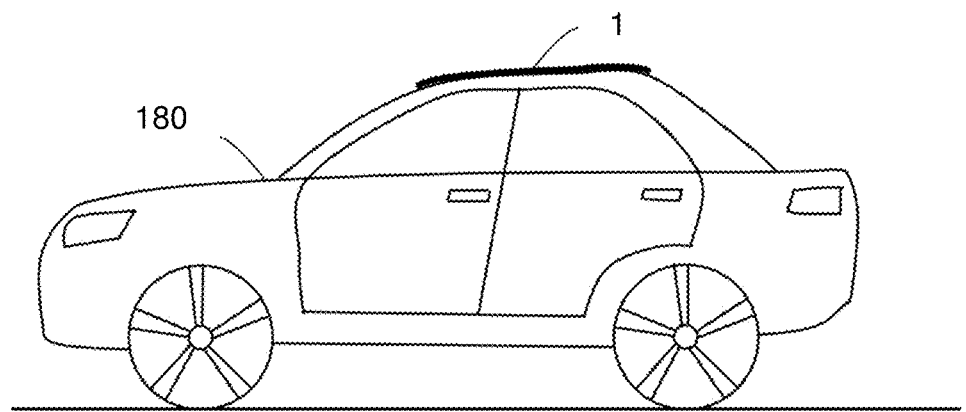
FIG. 7B: schematic illustration of a radiative cooling sheet with reflective layer directly attached to the roof of a car.
Figure 8C:
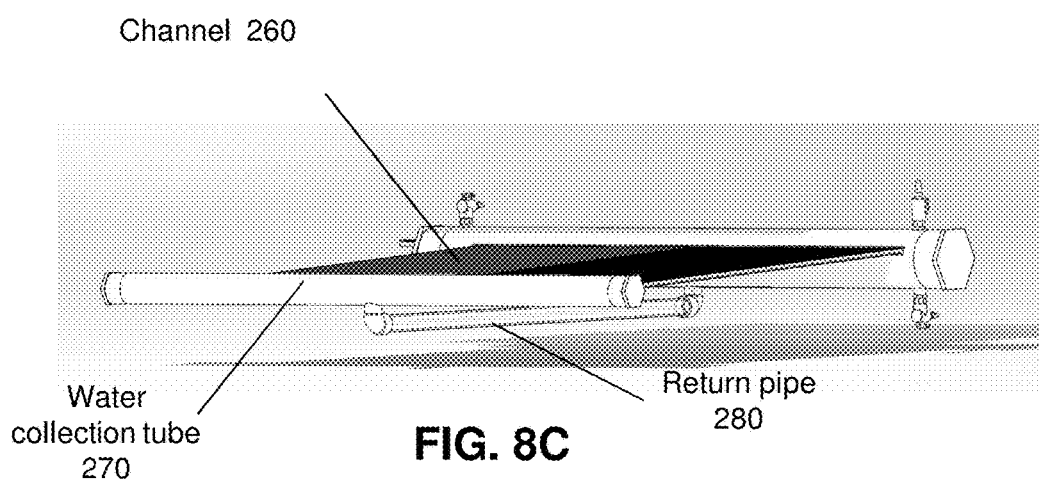
FIGS. 8C and 8D.
Figure 8D:
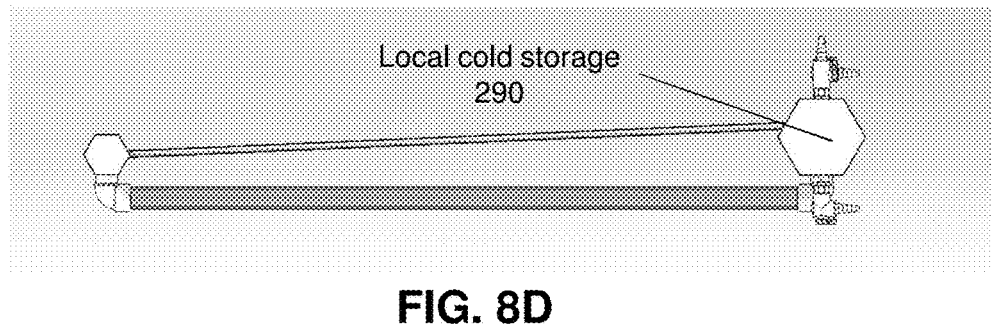
Figure 9:
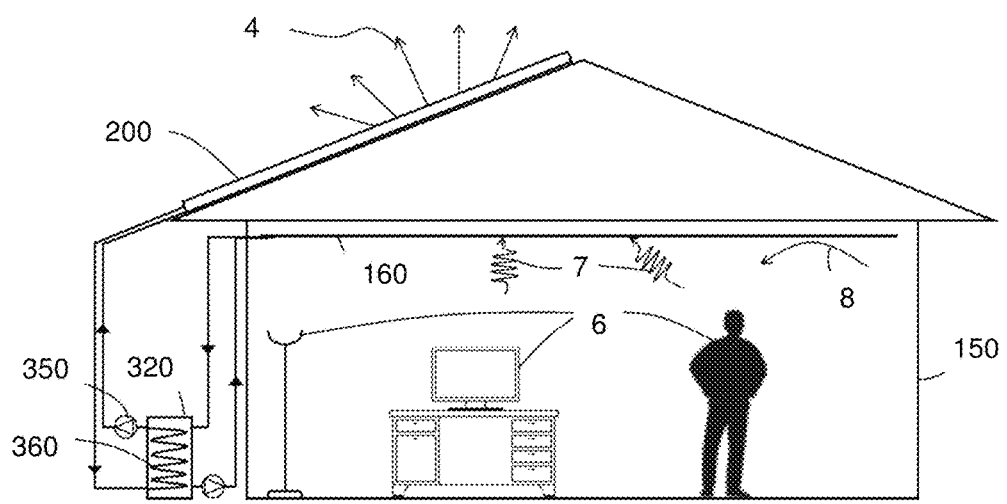
FIG. 9: schematic illustration of an active cooling system for buildings where radiative cooling structures is used to cool the cold storage system.
Figure 10A:
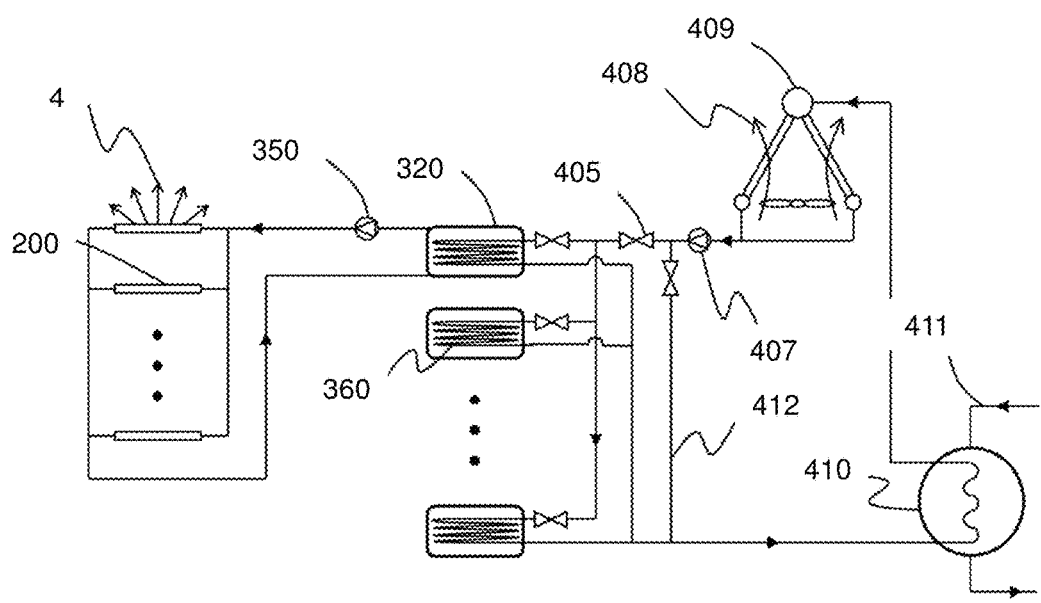
FIG. 10A: schematic illustration of multiple cold collection devices for supplemental cooling for a power plant condenser.
Figure 10B:
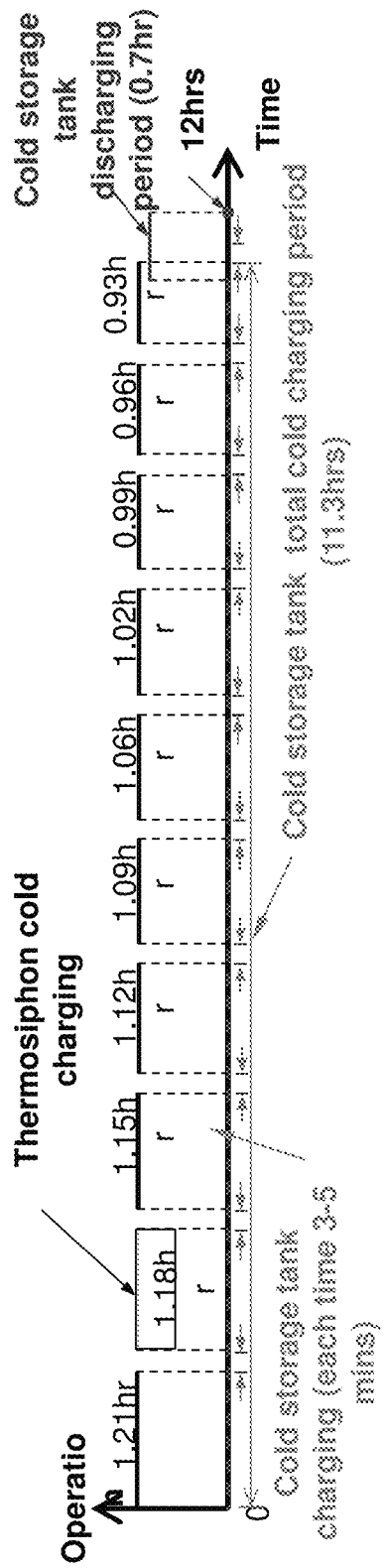
FIG. 10B: An exemplary 12-hour operating schedule to enable cold collection and storage using a passive thermosiphon to collect the cold achieved using selective radiative cooling structure.
Figure 11:
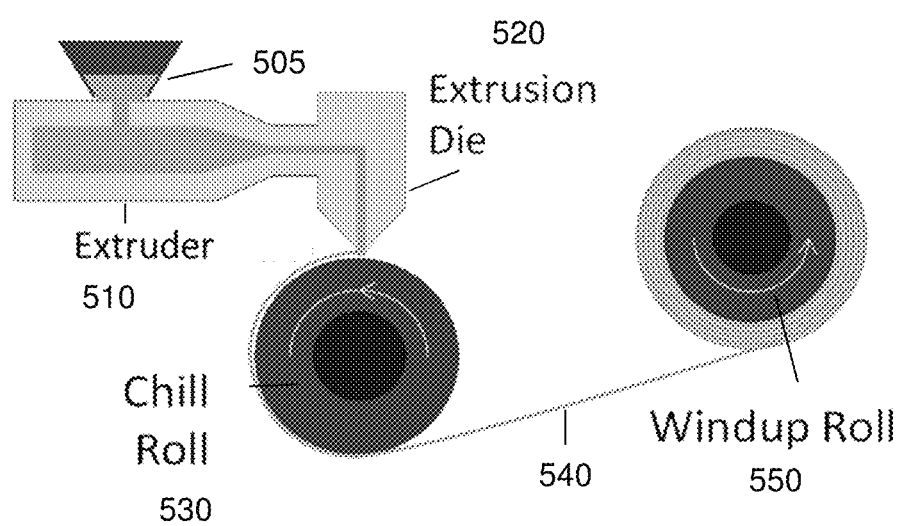
FIG. 11: schematic illustration of an apparatus for extrusion of a polymer-based film.
Figure 12:
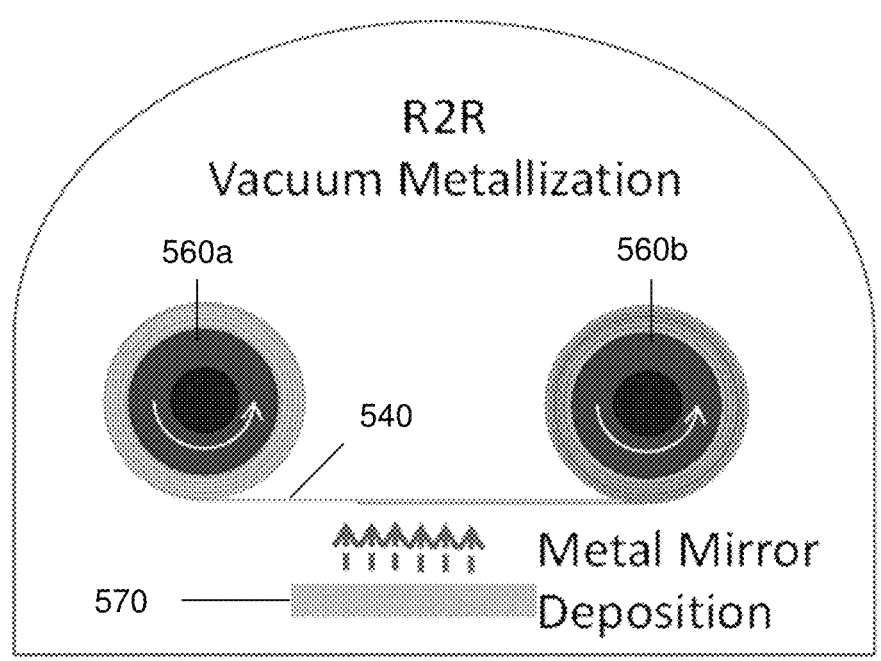
FIG. 12: schematic illustration of an apparatus for coating a film.

In the drawings, like reference numbers refer to like elements.

The electromagnetic spectrum can be classified into several regions. Regions referred to herein are the infrared region (wavelength approximately 1 mm to 750 nm), visible region (wavelength approximately 750 nm to 400 nm) and the ultraviolet region (wavelength approximately 400 nm to 40 nm). The infrared region has also been classified into sub-regions using various classification schemes; in the ISO classification scheme the mid-infrared is approximately 3 µm to 50 µm. As used herein the radiant flux is the radiant energy per unit time (e.g. W), the irradiance is the radiant flux received by a surface per unit area (e.g. $Wm^{-2}$) and the spectral irradiance is the irradiance of a surface per unit wavelength (e.g. $Wm^{-2}\ nm^{-1}$).

Electromagnetic radiation emitted from matter at a temperature above absolute zero may be referred to as thermal radiation. The solar spectrum refers to the distribution of electromagnetic radiation emitted by the sun. Most of the energy in the solar spectrum is concentrated from about 0.3 µm to about 3 µm, as can be seen from FIG. 1.

Emissivity specifies how well a real surface radiates energy as compared with a black-body and can range between 0 and 1. The directional spectral emissivity is the ratio of the emissive ability of the real surface to that of a black body. A total emissivity is averaged with respect to all wavelengths; a hemispherical emissivity is averaged with respect to all directions. As used herein, a selectively emissive layer is configured to emit electromagnetic radiation with an emissivity greater than zero at a temperature above absolute zero.

As used herein, a selectively emissive layer has an emissivity that is wavelength-selective. A selectively emissive layer is configured to thermally-generating electromagnetic emissions at temperatures other than absolute zero and is not a blackbody. Since emissivity correlates with absorptivity, a selectively emissive layer is also a selectively absorptive layer. In embodiments, the selectively emissive layer has high emissivity in at least some portions of the infrared portion of the spectrum, but has limited emission in at least some portions of the solar spectrum. Such a selectively emissive layer is also selectively absorptive, having high absorption in at least some portions of the infrared portion of the spectrum, but limited absorption in at least some portions of the solar spectrum.

As used herein, absorptivity is defined as the fraction of radiation energy incident on a surface of a body that is absorbed by the body. The incident radiation depends on the radiative conditions at the source of the incident energy. In an embodiment, the average absorptivity is a hemispherical absorptivity averaged over the wavelength range of interest.

As used herein, transmissivity is defined as the fraction of radiation energy incident on the surface of a body that is transmitted by the body. As used herein, transmissive material has a transmissivity on average greater than zero for radiation in the specified wavelength range. y. In an embodiment, the average transmissivity is a hemispherical transmissivity averaged over the wavelength range of interest. In some embodiments a transparent material has a transmittivity greater than 0.9 for the specified wavelength range.

As used herein reflectivity is defined as the fraction of radiation energy incident on a body that is reflected by the body. Solar reflectivity is defined as the fraction of radiation energy incident on a body that is reflected by the body in a specified region of the solar spectrum (e.g. 0.3 µm to 3 µm). In an embodiment, the solar reflectivity is averaged over the specified region of the spectrum. In an embodiment, the average reflectivity is a hemispherical reflectivity averaged over the wavelength range of interest.

As used herein, room temperature is approximately 20° C. to 25° C.

Embodiments of the present invention also pertain to methods for manufacturing radiative cooling structures on size scales useful for relevant cooling applications. In some embodiments of the present invention, dry polymer or polymer-based material is fed into an extruder, optionally an industrial extruder or die-caster, and is melted and extruded into thin sheets. As examples, the polymer fed to the extruder is in pellets, powdered, or any other dry form. In embodiments for producing composite emissive layers, the non-polymer materials, e.g., the dielectric or glass particles discussed above, are mixed into the polymer prior to, during or after melting of the polymer, and before extrusion. The non-polymer materials can be mixed in any manner and may be mixed to a uniform or near-uniform blend of the polymer and non-polymer materials. As discussed above, such polymer-based sheets can be 3 µm to several millimeters in thickness. The extruded sheets can be cast onto solid substrates or, in one embodiment, formed onto chilled rollers, forming standalone thin films.

In other embodiments, the polymer or polymer-based sheet can be manufactured by any one or combination of a variety of polymer production methods, including without limitation liquid or solution casting, blowing or blow molding, spinning, compression molding, spraying methods, and injection molding. For example, dry initial polymer material may be mixed with non-polymer particles, melted, and the melted mixture blown, compressed, or otherwise molded into any thickness sheets.

All patents and publications mentioned in the specification are indicative of the levels of skill of those skilled in the art to which the invention pertains. All references cited herein are hereby incorporated by reference to the extent not inconsistent with the disclosure herewith. All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups, including any isomers and enantiomers of the group members, and classes of compounds that can be formed using the substituents are disclosed separately. When a compound is claimed, it should be understood that compounds known in the art including the compounds disclosed in the references disclosed herein are not intended to be included. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, device elements, starting materials and synthetic methods other than those specifically exemplified can be employed in the practice of the invention without resort to undue experimentation. All art-known functional equivalents, of any such methods, device elements, starting materials and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The preceding definitions are provided to clarify their specific use in the context of the invention.

Although the description herein contains many specificities, these should not be construed as limiting the scope of the invention but as merely providing illustrations of some of the presently preferred embodiments of the invention. For example, thus the scope of the invention should be determined by the appended claims and their equivalents, rather than by the examples given.

The invention may be further understood by the following non-limiting examples.

Example: Polymethylpentene-Based Radiative Cooling Films

Figure 13A:
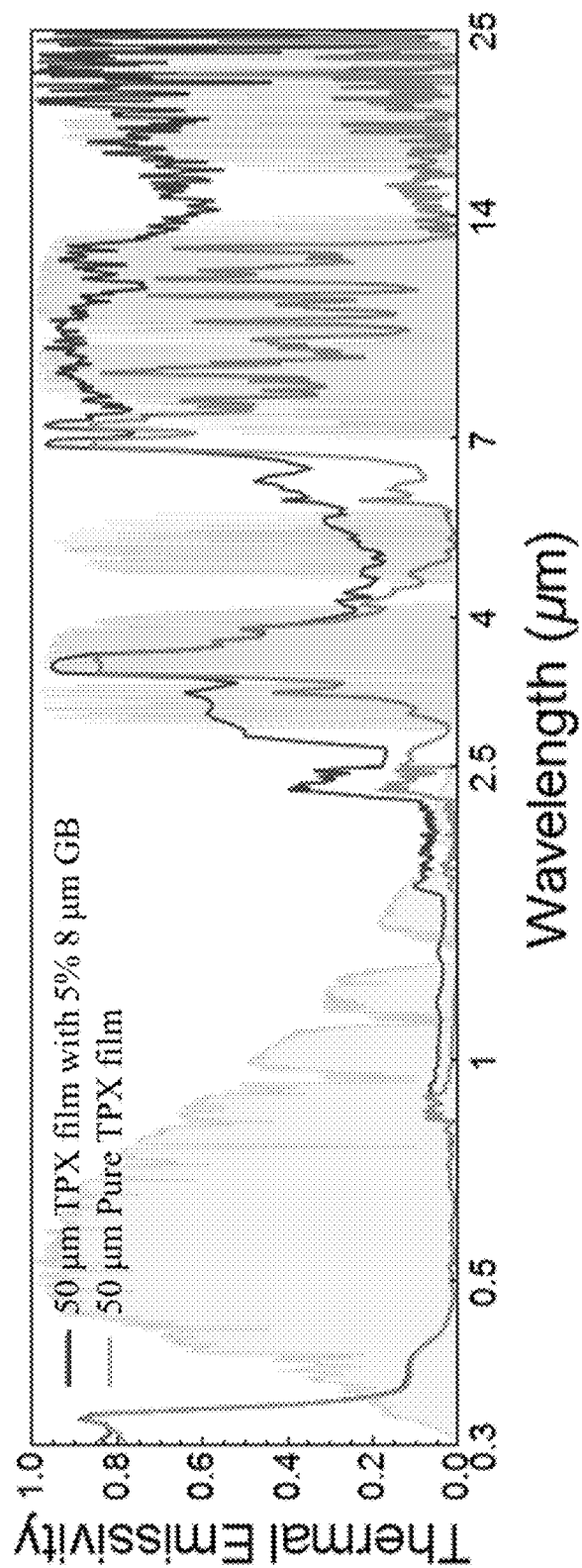
FIG. 13A shows the emissivity/absorptivity as a function of wavelength for a 50-µm-thick bare polymethylpentene (TPX™) films and a 50 µm thick film with 5% 8-µm-diameter solid silica microspheres.

FIG. 13A shows the emissivity/absorptivity as a function of wavelength for a 50-μm-thick bare polymethylpentene (TPX™) films and a 50 μm thick film with 5% 8-μm-diameter solid silica microspheres. The trace for the TPX™ film is lighter gray than the trace for the composite film. Polymethylpentene is index-matched with silica in the solar spectrum, but not in the infrared spectrum. The polymethylpentene film with silica microspheres significantly reduces the solar absorption but maintains a high emissivity at IR wavelengths of 7-13 μm. Without wishing to be bound by any particular belief, the silica spheres are believed to act as infrared scatterers and resonantly interact with infrared radiation, contributing to improved emissivity of the films.

Figure 13B:
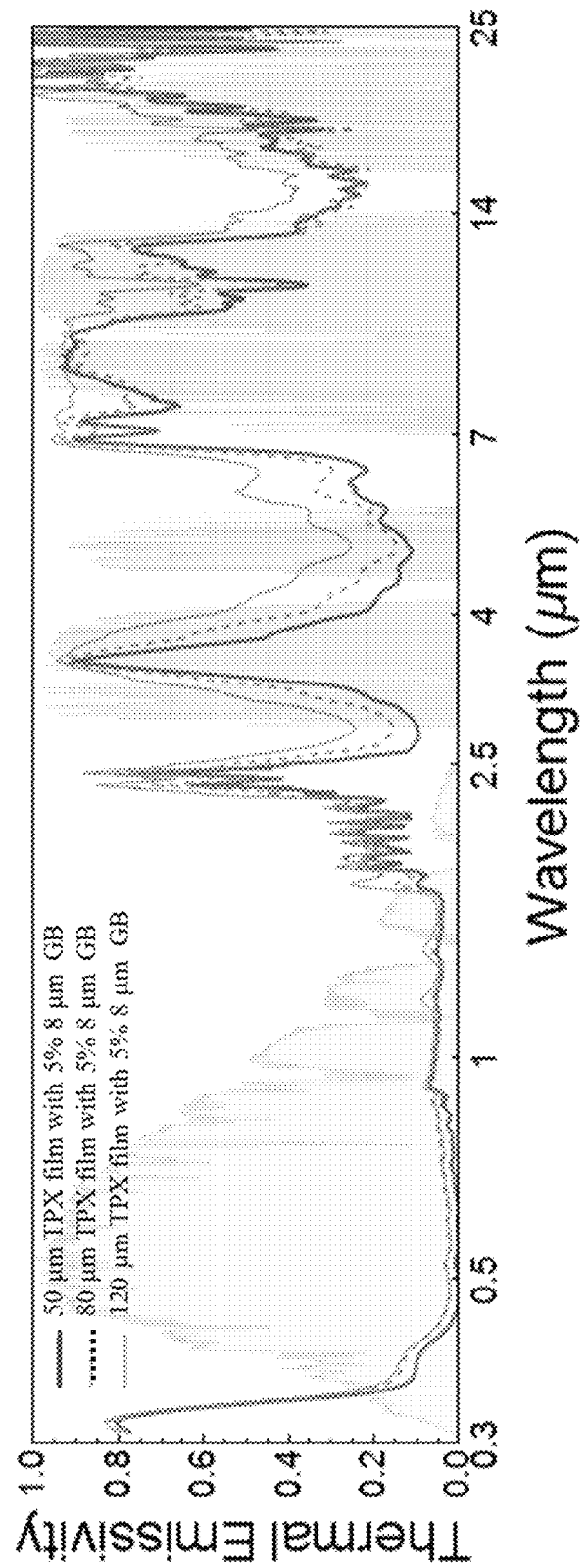
FIG. 13B shows the emissivity/absorptivity as a function of wavelength for polymethylpentene films of different thickness With 5% 8-µm-diameter solid silica microspheres.

FIG. 13B shows the emissivity/absorptivity as a function of wavelength for polymethylpentene films of different thickness with 5% 8-μm-diameter solid silica microspheres. (key: 50 μm film darker gray solid line, 80 μm film dashed line, 120 μm film lighter gray solid line). The thicker polymethylpentene film with silica microspheres increases the emissivity at IR wavelength of 7-13 μm without significant adsorption effect in solar spectrum.

Figure 13C:
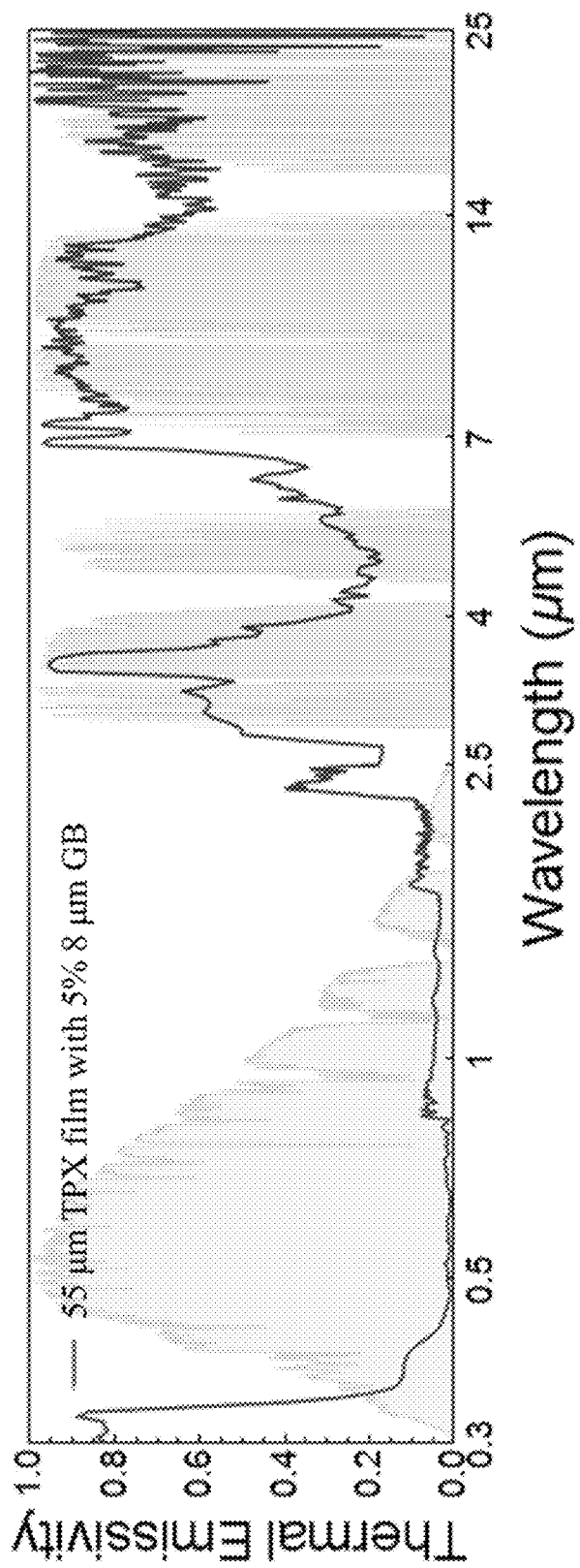
FIG. 13C shows the absorptivity/emissivity as a function of wavelength for of 55-µm-thick polymethylpentene film with 5% 8-µm-diameter solid silica microspheres.

FIG. 13C shows the absorptivity/emissivity as a function of wavelength for a 55-μm-thick polymethylpentene film with 5% 8-μm-diameter solid silica microspheres. The net day-time cooling power is 113 W/m$^2$ with <4% averaged solar absorptivity and >0.8 IR emissivity on average. Percentages of fillers given in FIGS. 13A-13C are by volume.

Figure 14:
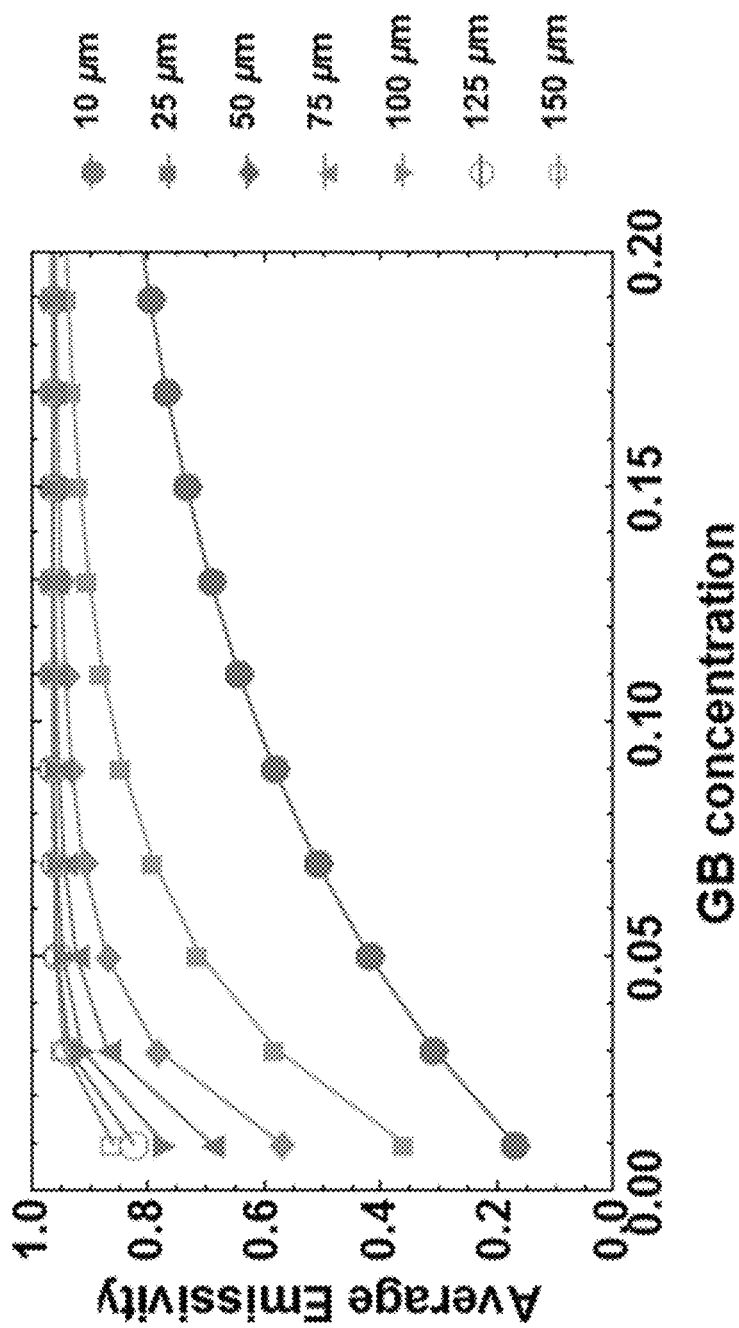
FIG. 14: illustrates the emissivity as a function of glass bead concentration for different size beads.

FIG. 14 shows the projected radiative cooling power of an emissive layer with a reflective layer. The emissive layer includes a polymer sheet with embedded dielectric spheres according to different volume ratios of embedded spheres and film thicknesses.

APPENDIX

Radiative Cooled-Cold Storage Modules and System (RadiCold)

Ronggui Yang1, Xiaobo Yin1, Gang Tan2

1Department of Mechanical Engineering, University of Colorado Boulder, Boulder, CO, 2Department of Civil and Architectural Engineering, University of Wyoming, Laramie, WY

Project Overview

Objective: Use radiative cooling to the low-temperature sky to produce cold water as supplemental cooling for thermoelectric power plant.

Approaches:

- Microstructured polymer-enabled RadiCold surface provides > 100W/m² cooling power for both day and night time operation
- Low-power-consumption two-stage cold collection and storage technique addresses gigantic energy density mismatch
- Roll-to-roll (R2R) technology enables scalable and cost-effective manufacturing of RadiCold surfaces

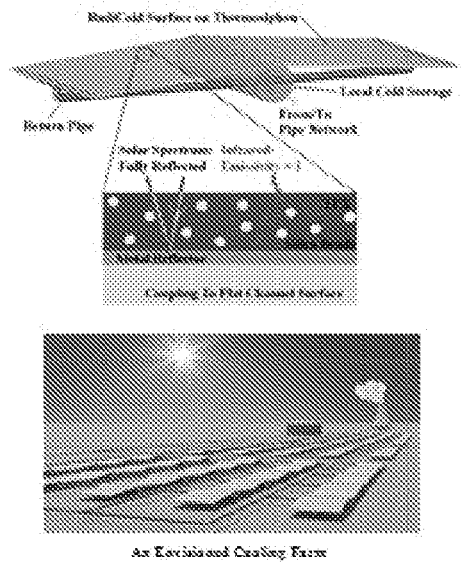

Technology Impact

Capable of meeting ARPA-E ARID program goals
- ≥ 100 W/m² radiative cooling power at both day and night time
- System cost ~ $133/kW$_{th}$
- ≤ 5% increase of the levelized cost of electricity (LCOE) relative to wet cooling

Transformative impact on electricity production, consumption of fuels, and greenhouse gas emission
- Utilize the "free" radiative cooling effect to the low-temperature sky
- No loss of power plant efficiency
- Cold water storage for easy integration with "existing" power plants
- Greatly relieve water shortage situation around the world

Scalable and cost-effective manufacturing
- Low cost RadiCold surface material
- Scalable R2R manufacturing
- Low cost plastic material for single-phase thermosiphon and second stage cold storage system APPENDIX
Radiative Cooled-Cold Storage Modules and System (RadiCold)
Ronggui Yang1, Xiaobo Yin1, Gang Tan2
1Department of Mechanical Engineering, University of Colorado Boulder, Boulder, CO, 2Department of Civil and Architectural Engineering, University of Wyoming, Laramie, WY
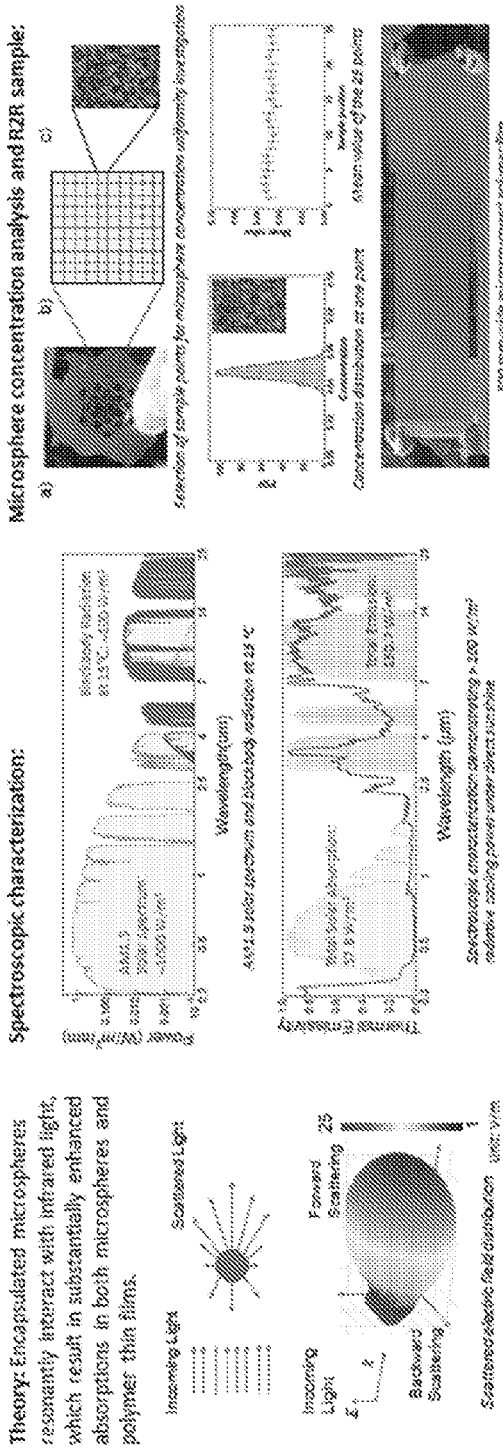
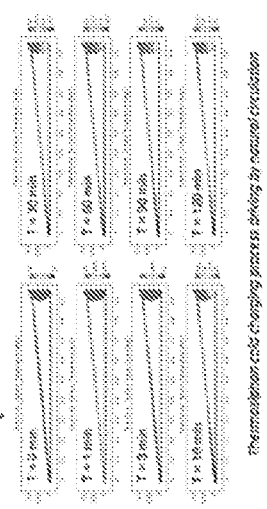
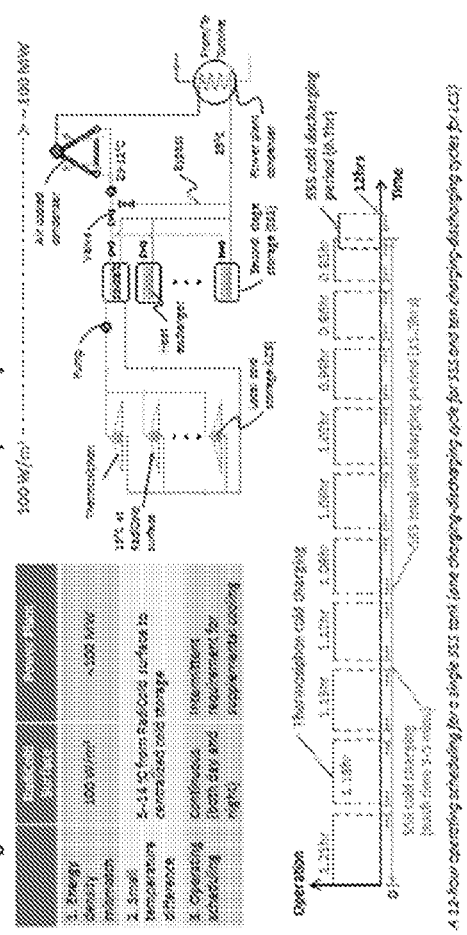

APPENDIX

Radiative Cooled-Cold Storage Modules and System (RadiCold)
Ronggui Yang1, Xiaobo Yin1, Gang Tan2
1Department of Mechanical Engineering, University of Colorado Boulder, Boulder, CO, 2Department of Civil and Architectural Engineering, University of Wyoming, Laramie, WY

Additional Applications: Building Example

- 41% of U.S. primary energy was consumed by the building sector.
- In 2015, space cooling represents 14% and 9% energy consumption in residential and commercial buildings, which means 3.07 and 1.56 QBtu respectively.
- Alternative cooling method is crucial for energy saving in buildings.
- RadiCold system can be easily integrated with building radiant ceiling.

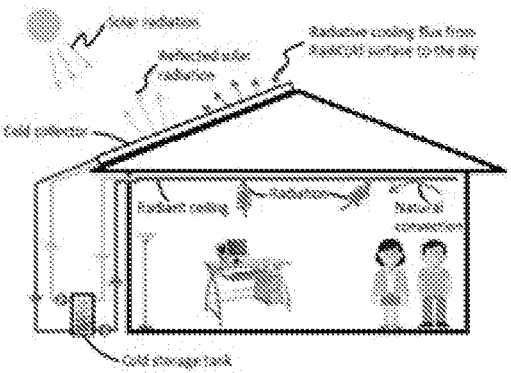

System Specifications:
- RadiCold system with ≥ 20 years of life time
- Roof-integrated cold collector
- 5-15 years payback period depends on different climate conditions

We claim:

1. A selective radiative cooling structure, the structure comprising:
    a selectively emissive layer comprising a polymer and a plurality of dielectric particles dispersed in the polymer, the volume percentage of the dielectric particles in the selectively emissive layer selected from the range of 1% to 25% and the particles characterized by an average size ranging from 3 µm to 30 µm;
    a reflective layer comprising a metal film or metal substrate, wherein the selectively emissive layer is provided on the reflective layer;
    wherein the selective radiative cooling structure is characterized by an average emissivity ranging from 0.6 to 1.0 over the wavelength range 7 µm to 13 µm;
    wherein the selectively emissive layer has a transmissivity of 0.7 to 1 over a solar wavelength range of 0.3 µm to 3 µm;
    wherein the polymer is selected from the group consisting of polymethyl methacrylate (PMMA), polyethylene terephthalate (PET), a 4-methyl-1-pentene polymer, a 4-methyl-1-pentene copolymer and polyvinyl fluoride;
    wherein the dielectric particles comprise silicon dioxide ($SiO_2$); and
    wherein the reflective layer is a silver film characterized by an average thickness from 20 nanometers to 300 nanometers.

2. The selective radiative cooling structure of claim 1, wherein the structure is in the form of a sheet.

3. The selective radiative cooling structure of claim 1, wherein the selective radiative cooling structure provides a radiative heat flux from 50 W/m² to 150 W/m² at a working temperature of 15° C.

4. The selective radiative cooling structure of claim 1, wherein the dielectric particles are characterized by an average size ranging from 4 µm to 10 µm.

5. The selective radiative cooling structure of claim 1, wherein the selectively emissive layer is characterized by an average thickness from 10 µm to 3 mm.

6. The selective radiative cooling structure of claim 1, wherein the selective radiative cooling structure further comprises a solar transparent, water-proof or weather resistant protective film that is a solar transparent and weather-resistant polymer.

7. The selective radiative cooling structure of claim 1, wherein a barrier layer or a protective layer is provided between said selectively emissive layer and said reflective layer.

8. The selective radiative cooling structure of claim 1, wherein the particles are characterized by an average size of 8 µm.

9. The selective radiative cooling structure of claim 1, wherein the polymer and dielectric particles are mixed as a uniform blend.

10. The selective radiative cooling structure of claim 1, wherein the selectively emissive layer is characterized by an average thickness from 5 µm to 500 µm.

11. The selective radiative cooling structure of claim 1, wherein the volume percentage of the dielectric particles in the selectively emissive layer selected from the range of 5% to 15%.

12. The selective radiative cooling structure of claim 1, wherein the polymer is selected from the group consisting of polyethylene terephthalate (PET), a 4-methyl-1-pentene polymer, and a 4-methyl-1-pentene copolymer.

13. The selective radiative cooling structure of claim 1, wherein the polymer is selected from the group consisting of a 4-methyl-1-pentene polymer, and a 4-methyl-1-pentene copolymer.

14. The selective radiative cooling structure of claim 1, wherein the polymer is a 4-methyl-1-pentene copolymer copolymer.

15. The selective radiative cooling structure of claim 1, wherein the polymer is a copolymer of poly(4-methyl-1 pentene) with α-olefins selected from the group consisting of 1-pentene, 1-hexene and 1-octene.

16. The selective radiative cooling structure of claim 15, wherein the dielectric particles are silica.

17. The selective radiative cooling structure of claim 16, wherein the selectively emissive layer is characterized by an average thickness from 5 µm to 500 µm.

18. The selective radiative cooling structure of claim 17, wherein the dielectric particles are characterized by an average size ranging from 4 µm to 10 µm.

19. The selective radiative cooling structure of claim 18, wherein the volume percentage of the dielectric particles in the selectively emissive layer selected from the range of 5% to 15%.

20. The selective radiative cooling structure of claim 19, wherein the polymer and dielectric particles are mixed as a uniform blend.

* * * * *

UNITED STATES PATENT AND TRADEMARK OFFICE
CERTIFICATE OF CORRECTION

PATENT NO. : 10,502,505 B2  
APPLICATION NO. : 15/056680  
DATED : December 10, 2019  
INVENTOR(S) : Ronggui Yang et al.

Page 1 of 1

It is certified that error appears in the above-identified patent and that said Letters Patent is hereby corrected as shown below:

In the Claims

In Claim 14, Column 26, Lines 24-25, replace "copolymer copolymer" with --copolymer--.

Signed and Sealed this  
Thirty-first Day of March, 2020

Andrei Iancu  
*Director of the United States Patent and Trademark Office*